(12) United States Patent
Tuli

(10) Patent No.: US 10,466,796 B2
(45) Date of Patent: Nov. 5, 2019

(54) PERFORMANCE OF AN OPERATION BASED AT LEAST IN PART ON TILT OF A WRIST WORN APPARATUS

(71) Applicant: Nokia Technologies Oy, Espoo (FI)

(72) Inventor: Apaar Tuli, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/120,648

(22) PCT Filed: Feb. 9, 2015

(86) PCT No.: PCT/FI2015/050080
§ 371 (c)(1),
(2) Date: Aug. 22, 2016

(87) PCT Pub. No.: WO2015/128539
PCT Pub. Date: Sep. 3, 2015

(65) Prior Publication Data
US 2017/0010678 A1  Jan. 12, 2017

(30) Foreign Application Priority Data

Feb. 27, 2014 (EP) .................................... 14156913

(51) Int. Cl.
*G06F 3/01* (2006.01)
*G06F 1/16* (2006.01)
(Continued)

(52) U.S. Cl.
CPC ............. *G06F 3/017* (2013.01); *G06F 1/163* (2013.01); *G06F 3/014* (2013.01); *G06F 3/015* (2013.01);
(Continued)

(58) Field of Classification Search
CPC .......... G06F 3/017; G06F 1/163; G06F 3/014; G06F 3/015; G06F 1/1616; G06F 1/3203;
(Continued)

(56) References Cited

U.S. PATENT DOCUMENTS

| 6,573,883 | B1 | 6/2003 | Bartlett | |
| 2007/0180409 | A1* | 8/2007 | Sohn | G06F 1/1616 |
| | | | | 715/863 |

(Continued)

FOREIGN PATENT DOCUMENTS

| CN | 101980516 A | 2/2011 |
| CN | 102012739 A | 4/2011 |

(Continued)

OTHER PUBLICATIONS

International Search Report and Written Opinion received for corresponding Patent Cooperation Treaty Application No. PCT/FI2015/050080, dated Apr. 23, 2015, 11 pages.

(Continued)

*Primary Examiner* — Richard J Hong
(74) *Attorney, Agent, or Firm* — Alston & Bird LLP

(57) ABSTRACT

A method comprising determining occurrence of a software event on a wrist worn apparatus, determining a notification based, at least in part, on the software event such that the notification comprises information that signifies the software event, causing rendering of the notification, determining that the wrist worn apparatus has been tilted from a user-facing direction to a non-user-facing direction, determining that the wrist worn apparatus has been tilted from the non-user-facing direction to another user-facing direction within a notification tilt actuation threshold duration from determining that the wrist worn apparatus has been tilted-from the user-facing direction to the non-user-facing direction- (Continued)

tion, and causing performance of at least one operation associated with the software event is disclosed.

23 Claims, 13 Drawing Sheets

(51) Int. Cl.
 *G06F 3/0346* (2013.01)
 *G06T 13/80* (2011.01)
(52) U.S. Cl.
 CPC .... *G06F 3/0346* (2013.01); *G06F 2200/1637* (2013.01); *G06T 13/80* (2013.01)
(58) Field of Classification Search
 CPC ........... G06F 3/0346; G06F 2200/1637; G06F 1/1626; G04G 21/00; G04C 3/002; G06T 13/80
 See application file for complete search history.

(56) References Cited

U.S. PATENT DOCUMENTS

| | | |
|---|---|---|
| 2008/0174547 A1 | 7/2008 | Kanevsky et al. |
| 2009/0195497 A1* | 8/2009 | Fitzgerald ............. G06F 1/3203 345/156 |
| 2009/0201270 A1 | 8/2009 | Pikkujamsa et al. |
| 2010/0138766 A1* | 6/2010 | Nakajima ............. G06F 1/1626 715/767 |
| 2011/0057880 A1 | 3/2011 | Kasahara |
| 2012/0056830 A1 | 3/2012 | Suzuki et al. |
| 2013/0002538 A1 | 1/2013 | Mooring et al. |
| 2013/0111579 A1 | 5/2013 | Newman et al. |
| 2013/0120106 A1 | 5/2013 | Cauwels et al. |
| 2013/0234924 A1 | 9/2013 | Janefalkar et al. |
| 2014/0160078 A1* | 6/2014 | Seo ......................... G06F 3/017 345/175 |
| 2015/0085621 A1* | 3/2015 | Hong ..................... G04G 21/00 368/10 |
| 2015/0185836 A1* | 7/2015 | Slonneger ............... G06F 3/014 345/156 |
| 2016/0202665 A1* | 7/2016 | Park ....................... G04C 3/002 368/225 |

FOREIGN PATENT DOCUMENTS

| | | |
|---|---|---|
| EP | 2631743 | 8/2013 |
| JP | H11232013 A | 8/1999 |
| JP | 2004-355229 A | 12/2004 |
| JP | 2006-229549 A | 8/2006 |
| JP | 2007-288421 A | 11/2007 |
| JP | 2009-229549 A | 10/2009 |
| JP | 2010-021902 A | 1/2010 |
| JP | 2012-058901 A | 3/2012 |
| JP | 2013-057515 A | 3/2013 |
| WO | 2009074185 | 6/2009 |

OTHER PUBLICATIONS

Office action received for corresponding Korean Patent Application No. 2016-7026567, dated Sep. 20, 2017, 7 pages of office action and no pages of office action translation available.
"Kreyos: the Only Smartwatch withVoice & Gesture Control", Indiegogo, Retrieved on Aug. 18, 2017, Webpage available at : https://www.indiegogo.com/projects/kreyos-the-only-smartwatch-with-voice-gesture-control#/.
"Hello, This is Your Wristwatch Calling", Cnet Reveiws, Retrieved on Oct. 30, 2013, Webpage available at : https://www.cnet.com/products/martian-passport-watch/2/.
Rahman et al., "Tilt Techniques: Investigating the Dexterity of Wristbased Input", Proceedings of the SIGCHI Conference on Human Factors in Computing Systems, Apr. 4-9, 2009, 10 pages.
Extended European Search Report received for corresponding European Patent Application No. 14156913.7, dated Jul. 16, 2014, 8 pages.
Office action received for corresponding Japansese Patent Application No. 2016-554455, dated Aug. 8, 2017, 3 pages of office action and 6 pages of translation available.
Office Action for Japanese Application No. 2016-554455 dated Jun, 12, 2018, 10 pages.
Office Action for European Application No. 14156913.7 dated Aug. 1, 2018, 10 pages.
Office Action for Korean Application No. 2016-7026567 dated Jul. 26, 2018, 10 pages.
Office Action for Chinese Application No. 201580022220.7 dated Oct. 19, 2018, 11 pages.
Office Action for Japanses Application No. 2016-554455 dated Jan. 22, 2019, 5 pages.
Office Action for Korean Application No. 10-2016-7026567 dated Dec. 21, 2018, 6 pages.
Office Action for Chinese Application No. 201580022220.7 dated Jul. 16, 2019, 7 pages.
Summons to Attend Oral Proceedings for European Application No. 14156913.7 dated Jul. 15, 2019, 11 pages.

* cited by examiner

Supination  Pronation
301  302

PERFORMANCE OF AN OPERATION BASED AT LEAST IN PART ON TILT OF A WRIST WORN APPARATUS

RELATED APPLICATION

This application was originally filed as PCT Application No. PCT/FI2015/050080 filed Feb. 9, 2015, which claims priority benefit from EP Application No. 14156913.7, filed Feb. 27, 2014.

TECHNICAL FIELD

The present application relates generally to performance of an operation based, at least in part, on tilt of a wrist worn apparatus.

BACKGROUND

As users have become increasingly dependent upon their electronic apparatuses throughout their daily lives, the prominence of such apparatuses in the daily lives of such users has grown. In some circumstances, user may desire to wear their apparatuses, for example to free them from the burden of carrying the apparatuses. For example, a user may desire to wear his apparatus on his wrist. In such circumstances, a wrist worn apparatus may pose various interactional challenges. It may be desirable to provide an interface for a wrist worn apparatus that is simple and intuitive.

SUMMARY

Various aspects of examples of the invention are set out in the claims.

One or more embodiments may provide an apparatus, a computer readable medium, a non-transitory computer readable medium, a computer program product, and a method for determining occurrence of a software event on a wrist worn apparatus, determining a notification based, at least in part, on the software event such that the notification comprises information that signifies the software event, causing rendering of the notification, determining that the wrist worn apparatus has been tilted from a user-facing direction to a non-user-facing direction, determining that the wrist worn apparatus has been tilted from the non-user-facing direction to another user-facing direction within a notification tilt actuation threshold duration from determining that the wrist worn apparatus has been tilted from the user-facing direction to the non-user-facing direction, and causing performance of at least one operation associated with the software event based, at least in part, on the determination that the wrist worn apparatus has been tilted from the non-user-facing direction to the other user-facing direction within the notification tilt actuation threshold duration from determining that the wrist worn apparatus has been tilted from the user-facing direction to the non-user-facing direction.

One or more embodiments may provide an apparatus, a computer readable medium, a computer program product, and a non-transitory computer readable medium having means for determining occurrence of a software event on a wrist worn apparatus, means for determining a notification based, at least in part, on the software event such that the notification comprises information that signifies the software event, means for causing rendering of the notification, means for determining that the wrist worn apparatus has been tilted from a user-facing direction to a non-user-facing direction, means for determining that the wrist worn apparatus has been tilted from the non-user-facing direction to another user-facing direction within a notification tilt actuation threshold duration from determining that the wrist worn apparatus has been tilted from the user-facing direction to the non-user-facing direction, and means for causing performance of at least one operation associated with the software event based, at least in part, on the determination that the wrist worn apparatus has been tilted from the non-user-facing direction to the other user-facing direction within the notification tilt actuation threshold duration from determining that the wrist worn apparatus has been tilted from the user-facing direction to the non-user-facing direction.

In at least one example embodiment, the operation associated with the software event comprises determination of supplemental information associated with the software event, and causation of rendering of, at least part of, the supplemental information.

In at least one example embodiment, the notification fails to comprise a part of the supplemental information.

In at least one example embodiment, the notification comprises at least one of a visual notification, an audible notification, or a tactile notification.

In at least one example embodiment, causation of rendering of the notification comprises at least one of causation of display of a visual notification, causation of actuation of an audible notification, or causation of actuation of a tactile notification.

In at least one example embodiment, the supplemental information comprises at least one of visual supplemental information, audible supplemental information, or tactile supplemental information.

One or more example embodiments further perform causation of display of an animation indicative of a transition from display of the visual notification to display of the visual supplemental information.

One or more example embodiments further perform determination that the wrist worn apparatus is tilting from the non-user-facing direction towards the other user-facing direction, wherein the causation of display of the animation is based, at least in part, on the determination that the wrist worn apparatus is tilting from the non-user-facing direction towards the other user-facing direction.

In at least one example embodiment, the causation of display of the animation comprises determination of a current tilt direction of the wrist worn apparatus, determine a tilt progression percentage that represents the tilt direction as a percentage difference between the non-user-facing direction and the other user-facing direction, and determination of a frame of the animation that corresponds with an animation progress percentage that is equivalent to the tilt progression percentage.

One or more example embodiments further perform determination that the notification tilt actuation threshold duration has elapsed since the determination that the wrist worn apparatus has been tilted from the user-facing direction to the non-user-facing direction and termination of display of the animation based, at least in part, on the determination that the notification tilt actuation threshold duration has elapsed since the determination that the wrist worn apparatus has been tilted from the user-facing direction to the non-user-facing direction.

In at least one example embodiment, termination of the animation comprises reversal of progression of the animation until a start frame of the animation is displayed, and causation of display of the visual notification absent the animation.

In at least one example embodiment, the notification excludes the supplemental information.

In at least one example embodiment, the software event is receipt of a message, and the determination of the occurrence of the software event comprises receipt of the message.

In at least one example embodiment, the notification comprises information indicative of a sender of the message.

In at least one example embodiment, the supplemental information is, at least part of, a body of the message.

In at least one example embodiment, the software event is occurrence of a calendar event that is associated with a calendar entry, and the determination of the occurrence of the software event comprises determination that a current time corresponds with an occurrence time of the calendar entry.

In at least one example embodiment, the notification comprises information indicative of a title of the calendar entry.

In at least one example embodiment, the notification comprises information indicative of the occurrence time of the calendar entry.

In at least one example embodiment, the supplemental information is, at least part of, a body of the calendar entry.

In at least one example embodiment, the software event is a receipt of a call, and the determination of the occurrence of the software event comprises receipt of the call.

In at least one example embodiment, the notification comprises information indicative of a caller of the call.

In at least one example embodiment, the operation associated with the software event comprises answering of the call.

In at least one example embodiment, the operation associated with the software event comprises rejection of the call.

In at least one example embodiment, the determination that the wrist worn apparatus has been tilted from the user-facing direction to the non-user-facing direction comprises determination that the wrist worn apparatus is oriented in a user-facing direction, and determination that the wrist worn apparatus has become oriented in a direction that is beyond a user-facing directional threshold.

In at least one example embodiment, the user-facing directional threshold is a direction beyond which an orientation is considered to be oriented in a non-user-facing direction.

In at least one example embodiment, the user-facing directional threshold is a direction within which an orientation is considered to be oriented in a user-facing direction.

In at least one example embodiment, a direction being beyond the user-facing directional threshold is indicative of wrist supination beyond the user-facing directional threshold.

In at least one example embodiment, the user-facing directional threshold corresponds with a wrist upon which the wrist worn apparatus is worn being at an orientation that is between an anatomical orientation and a horizontally pronated orientation.

In at least one example embodiment, the user-facing directional threshold corresponds with a wrist upon which the wrist worn apparatus is worn being at an anatomical orientation.

In at least one example embodiment, the user-facing directional threshold corresponds with a wrist upon which the wrist worn apparatus is worn being at an orientation that is at a 45 degree pronated orientation.

In at least one example embodiment, a direction being beyond the user-facing directional threshold is indicative of gravity being in a direction that is upward from the user-facing directional threshold.

In at least one example embodiment, the user-facing directional threshold corresponds with gravity being in a direction that is between perpendicular to a back of the wrist worn apparatus and directly upward from a top of the wrist worn apparatus.

In at least one example embodiment, the user-facing directional threshold corresponds with gravity being in a direction that is directly upward from a top of the wrist worn apparatus.

In at least one example embodiment, the user-facing directional threshold corresponds with gravity being in a direction that is at a median between perpendicular to a back of the wrist worn apparatus and directly upward from a top of the wrist worn apparatus.

In at least one example embodiment, the determination that the wrist worn apparatus has been tilted from the non-user-facing direction to the other user-facing direction comprises determination that the wrist worn apparatus has become oriented in a direction that is within a user-facing directional threshold.

One or more example embodiments further perform determination that the wrist worn apparatus is oriented in another non-user-facing direction, and determination that the wrist worn apparatus has become oriented in the user-facing direction, wherein the determination that the wrist worn apparatus has been tilted from the user-facing direction to the non-user-facing direction is predicated by the determination that the wrist worn apparatus is oriented in the other non-user-facing direction.

One or more example embodiments further perform, prior to the determination that the wrist worn apparatus has been tilted from a user-facing direction to a non-user-facing direction, determination that the wrist worn apparatus has been tilted from the user-facing direction to another non-user-facing direction, determination that the notification tilt actuation threshold duration has elapsed since the determination that the wrist worn apparatus has been tilted from the user-facing direction to the other non-user-facing direction, and avoidance of performance of the operation associated with the software event based, at least in part, on the determination that the notification tilt actuation threshold duration has elapsed.

One or more example embodiments further perform determination of another occurrence of the software event on the wrist worn apparatus, determination of another notification based, at least in part, on the software event such that the notification comprises information that signifies the software event, causation of rendering of the notification, determination that the wrist worn apparatus has been reoriented from a user-facing direction to a notification termination orientation, and termination of rendering of the other notification based, at least in part, on the determination that the wrist worn apparatus has been reoriented from the user-facing direction to the notification termination orientation.

In at least one example embodiment, the notification termination orientation is indicative of a forearm of a wrist upon which the wrist worn apparatus is worn being in an anatomical position.

In at least one example embodiment, the notification termination orientation is indicative of gravity being sideward of a notification termination gravity threshold.

In at least one example embodiment, the notification termination gravity threshold is a direction that is 45 degrees from a purely sideward direction.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
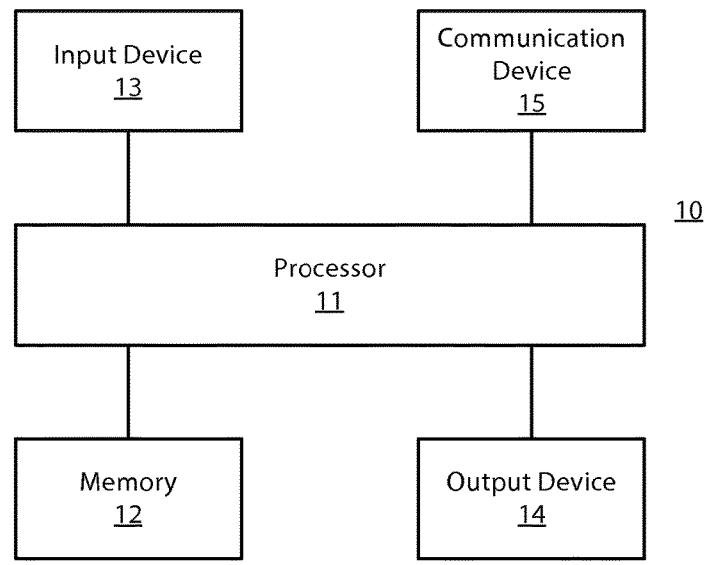
FIG. 1 is a block diagram showing an apparatus according to at least one example embodiment.

An embodiment of the invention and its potential advantages are understood by referring to FIGS. 1 through 13 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a wearable apparatus, a wrist worn apparatus, a watch apparatus, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
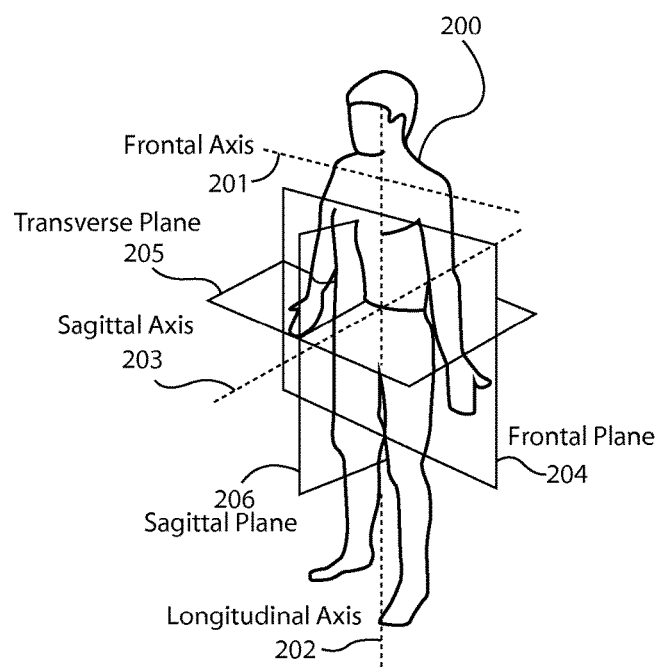
FIG. 2 is a diagram illustrating anatomical terms of location, orientation, and/or the like, with respect to a user.

FIG. 2 is a diagram illustrating anatomical terms of location, orientation, and/or the like, with respect to user 200. It can be seen that user 200 is depicted in an anatomic position. An anatomic position relates to a posture of a human body in which the body is standing with legs slightly apart with feet forward and palms facing forward. The body of user 200 may be described in relation to three fundamental axes that are orthogonal to each other; the frontal axis, the longitudinal axis, and the sagittal axis. Frontal axis 201 relates to an imaginary line that extends from right to left through a center point or axis of user 200. Longitudinal axis 202 relates to a line that extends from superior (upper) to inferior (lower) through a center point or axis of user 200. Sagittal axis 203 relates to a line that extends from anterior to posterior through a center point or axis of user 200. Frontal plane 204 relates to a plane that divides user 200 into anterior and posterior halves along frontal axis 201 and longitudinal axis 202. It can be seen that, when user 200 is in the anatomical position, the frontal plane divides the wrist and hand of user 200. Transverse plane 205 relates to a plane that divides user 200 into superior and inferior parts through frontal axis 201 and sagittal axis 203. Sagittal plane 206 relates to a plane that divides user 200 into left and right parts through sagittal axis 203 and longitudinal axis 202.

FIGS. 3A-3D are diagrams illustrating wrist orientation according to at least one example embodiment. The examples of FIGS. 3A-3D are merely examples and do not limit the scope of the claims. For example, alignment of the forearm may vary, position of the arm may vary, orientation of the hand may vary, and/or the like.

Physical movement with respect to a wrist may be characterized in terms of fundamental movements. For example, a complex wrist movement may be characterized by the manner in which the complex movement incorporates distinct fundamental movements. FIGS. 3A-3D illustrate examples of wrist supination and wrist pronation. However, the orientations and/or movements associated with the examples of FIGS. 3A-3D may be combined with other fundamental movements, such as contraction, extension, adduction, abduction, deviation, and/or the like. The orientations of FIGS. 3A-3D are described in relation to a neutral orientation of the wrist. In at least one example embodiment, a neutral orientation of the wrist is an orientation such that the hand that aligns with the wrist in conformance with the anatomical position with the fingers (including the thumb) of the hand together. In at least one example embodiment, a neutral orientation of the wrist is an orientation such that the hand that aligns with the wrist in conformance with the anatomical position, absent regard for position of the fingers. The particular neutral position that is utilized for any given circumstances may vary.

Figure 3A:
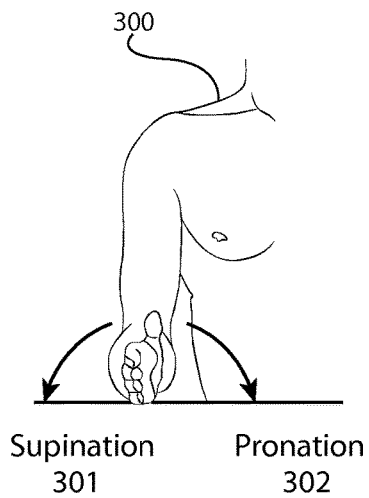
FIGS. 3A-3D are diagrams illustrating wrist orientation according to at least one example embodiment.
Figure 3B:
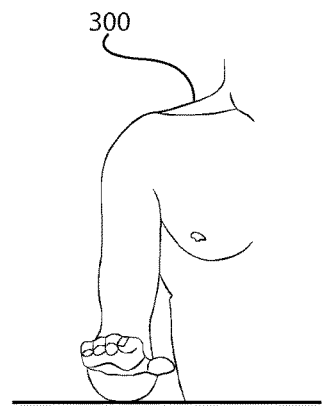

FIG. 3A is a diagram illustrating wrist supination and pronation according to at least one example embodiment. Wrist supination and pronation are characterized by lateral movement of the forearm that causes rotation of the wrist. Supination 301 is forearm movement associated with turning the palm forward (anteriorly) or upward, performed by lateral rotation of the forearm. Pronation 302 is forearm movement associated with turning the palm rearward (posteriorly) or downward, performed by lateral rotation of the forearm. The example of FIG. 3A illustrates the wrist of user 300 in an anatomical orientation. In at least one example embodiment, wrist orientation is characterized in reference to a movement from the anatomical orientation. In the example of FIG. 3B, the wrist of user 300 is in a horizontally pronated orientation. In at least one example embodiment, a horizontally pronated orientation is a wrist orientation that is characterized by a ninety degree pronation from the anatomical orientation. It can be seen that the horizontally pronated orientation corresponds with the palm of the hand facing the same direction as the elbow. In at least one example embodiment a horizontally supinated orientation is a wrist orientation that is characterized by a ninety degree supination from the anatomical orientation. In this manner, the horizontally pronated orientation corresponds with the pal of the hand facing in the opposite direction as the elbow.

It should be understood that the wrist orientation may be characterized by way of the magnitude of pronation or the magnitude of supination from the anatomical orientation. For example, the horizontally pronated orientation may be characterized as a ninety degree pronated orientation. Similarly, the horizontally supinated orientation may be characterized as a ninety degree supinated orientation.

Figure 3C:
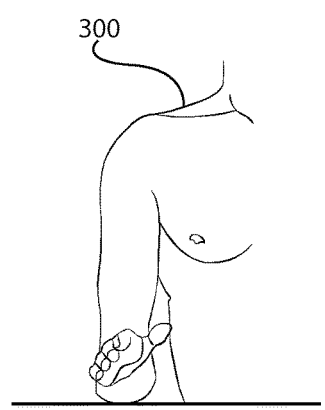

The example of FIG. 3C illustrates the wrist of user 300 in a forty five degree pronated orientation. It can be seen that the orientation of FIG. 3C illustrates the wrist of user 300 after user 300 performs a forty five degree pronation from the anatomical orientation of FIG. 3A.

Figure 3D:
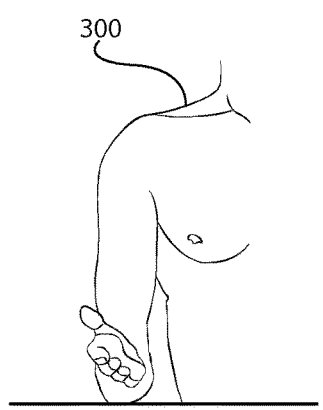

The example of FIG. 3D illustrates the wrist of user 300 in a forty five degree supinated orientation. It can be seen that the orientation of FIG. 3D illustrates the wrist of user 300 after user 300 performs a forty five degree supination from the anatomical orientation of FIG. 3A.

In at least one example embodiment, the generalized movement of supination and/or pronation is referred to as tilting. For example, pronation of the wrist may be referred to as tilting the wrist, and supination of the wrist may be referred to as tilting.

FIGS. 4A-4D are diagrams illustrating a wrist worn apparatus orientation according to at least one example embodiment. The examples of FIGS. 4A-4D are merely examples and do not limit the scope of the claims. For example, alignment of the forearm may vary, position of the arm may vary, orientation of the hand may vary, and/or the like.

As users have become increasingly reliant on their electronic apparatuses throughout the activities of their lives, many users may desire persistent presence of their apparatuses. In this manner, it may be desirable for an electronic apparatus to be a wearable apparatus. In at least one example embodiment, a wearable apparatus is an apparatus that is configured to be adorned on a user such that the user's body supports the apparatus absent the user holding the apparatus. For example, the apparatus may be configured to become affixed to a part of the user's body, a part of the user's clothing, and/or the like. In some circumstances, it may be desirable to characterize a wearable apparatus based, at least in part, on the manner in which the apparatus is configured to be worn by the user. For example, the apparatus may be a wrist worn apparatus. In at least one example embodiment, a wrist worn apparatus is an apparatus that is configured to be worn on the wrist of a user. In this manner, the wrist worn apparatus is configured to be supported by the wrist of the user such that the support is independent of the user actively holding the wrist worn apparatus. For example, the wrist worn apparatus may be a watch apparatus, a bracelet apparatus, and/or the like.

In at least one example embodiment, the wrist worn apparatus comprises at least one display. In at least one example embodiment, the wrist worn apparatus is configured to be worn on the wrist of the user such that the display of the wrist worn apparatus faces in the same direction as the top of the user's hand. In this manner, the display of the wrist worn apparatus may be aligned with the top of the user's wrist. Therefore, in many circumstances, the tilting of the wrist may directly cause tilting of the display of the wrist worn apparatus. In this manner, the orientation of the wrist may indicate the orientation of the display of the wrist worn apparatus. In many circumstances, the wrist may be oriented in a manner that allows the user to view the display of the apparatus, in manner that prevents the user from directly viewing the display of the apparatus, and/or the like. In this manner, the orientation of the wrist may indicate whether a user is capable of viewing the display. In at least one example embodiment, the orientation of the apparatus may be described in terms of the user's view of the display of the apparatus.

In at least one example embodiment, the wrist worn apparatus is oriented in a user-facing direction. In at least one example embodiment, a user-facing direction refers to the apparatus being oriented such that the display of the wrist worn apparatus is consistent with a direction that faces the eyes of the user. It should be understood that the user-facing direction does not necessarily need to direct the display towards the current position of the user's eye. The user-facing direction may be characterized by a direction from the display of the apparatus that would be viewable from the eyes of the user in conditions where the user's head is in an anatomical position, in conditions where the user's head is directed towards the wrist worn apparatus, and/or the like. In this manner, the wrist worn apparatus may be oriented in a user-facing direction, even if the user turns his head to look away from the wrist worn apparatus.

In at least one example embodiment, the wrist worn apparatus is oriented in a non-user-facing direction. In at least one example embodiment, a non-user-facing direction refers to the apparatus being oriented such that the display of the wrist worn apparatus is inconsistent with a direction that faces the eyes of the user. It should be understood that the non-user-facing direction does not necessarily need to direct the display away from the current position of the user's eye. The non-user-facing direction may be characterized by a direction from the display of the apparatus that would be non-viewable from the eyes of the user in conditions where the user's head is in an anatomical position, in conditions where the user's head is directed towards the wrist worn apparatus, and/or the like. In this manner, the wrist worn apparatus may be oriented in a non-user-facing direction, even if the user contorts his body in a manner inconsistent with the anatomical position to achieve a viewing angle of the wrist worn apparatus.

Figure 4A:
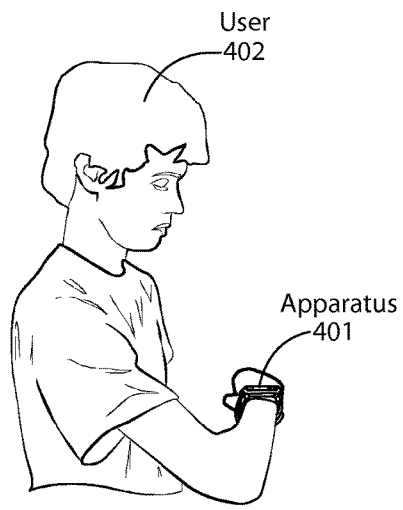
FIGS. 4A-4D are diagrams illustrating a wrist worn apparatus orientation according to at least one example embodiment.

The example of FIG. 4A illustrates apparatus 401 oriented in a user-facing direction to user 402. It can be seen that the display of the apparatus is directed upward from the user's wrist such that the display may be seen by user 402 when user 402 has his head in the anatomical position. It can be seen that the wrist orientation of the wrist upon which the wrist worn apparatus is worn is oriented in a horizontal pronated orientation, similar as described regarding FIG. 3B.

Figure 4B:
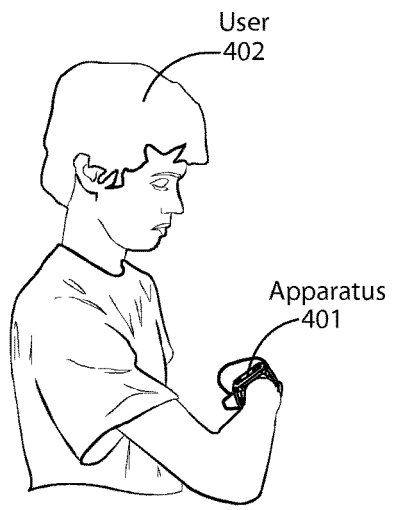

The example of FIG. 4B illustrates apparatus 401 oriented in a user-facing direction to user 402. It can be seen that the user-facing direction of FIG. 4B is different from the user-facing direction of FIG. 3B. It can be seen that the display of the apparatus is directed upward from the user's wrist such that the display may be seen by user 402 when user 402 has his head in the anatomical position. It can be seen that the wrist orientation of the wrist upon which the wrist worn apparatus is worn is oriented in a one hundred thirty five degree supinated orientation.

Figure 4C:
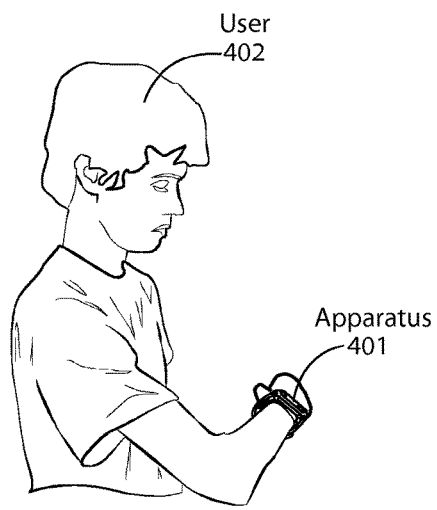

The example of FIG. 4C illustrates apparatus 401 oriented in a non-user-facing direction to user 402. It can be seen that the display of the apparatus is directed upward from the user's wrist such that user 402 may fail to be able to see the display of apparatus 401 when user 402 has his head in the anatomical position. For example, the line of sight of user 402 may be parallel to the surface of the display of apparatus 401. It can be seen that the wrist orientation of the wrist upon which the wrist worn apparatus is worn is oriented in a horizontal pronated orientation, similar as described regarding FIG. 3C.

Figure 4D:
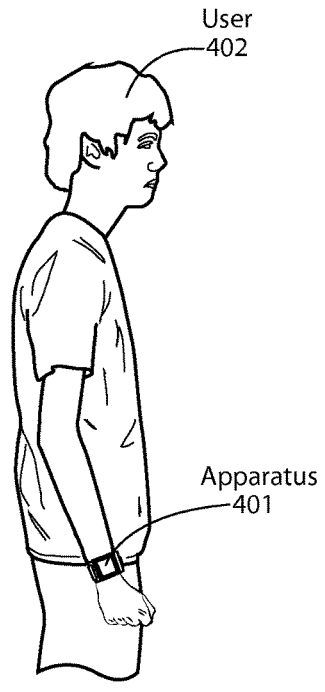

The example of FIG. 4D illustrates user 402 orienting his forearm such wrist worn apparatus 401 is at the side of user 402. In this manner, apparatus 401 may be oriented in a non-user-facing direction. In the example of FIG. 4D, the forearm of the wrist upon which the wrist worn apparatus is being worn is in an anatomical position.

In at least one example embodiment, determination of an orientation of the wrist worn apparatus is based, at least in part, on a user-facing directional threshold. In at least one example embodiment, the user-facing directional threshold is a direction beyond which an orientation is considered to be oriented in a non-user-facing direction. For example, in circumstances where the display is in a direction that is beyond the user-facing directional threshold, the apparatus may determine that an orientation of the apparatus is in a non-user-facing direction. In such an example, the wrist of the user may be supinated beyond the user-facing directional threshold, may be pronated to an insufficient magnitude to be within the user-facing directional threshold, and/or the like. In at least one example embodiment, the user-facing directional threshold is a direction within which an orientation is considered to be oriented in a user-facing direction. For example, in circumstances where the display is in a direction that is within the user-facing directional threshold, the apparatus may determine that an orientation of the apparatus is in a user-facing direction. In such an example, the wrist of the user may fail to be supinated beyond the user-facing directional threshold, may be pronated to sufficient magnitude to be within the user-facing directional threshold, and/or the like.

In at least one example embodiment, the user-facing directional threshold is indicative of the anatomical orientation. In such an example, the direction being beyond the user-facing directional threshold is indicative of wrist supination beyond the user-facing directional threshold. For example, if the wrist on which the wrist worn apparatus is worn is oriented similarly to the orientation of FIG. 3D, the apparatus may determine that the apparatus is oriented in a non-user-facing direction. In such an example, the apparatus may determine that the wrist worn apparatus is oriented in a direction that is beyond the user-facing directional threshold. In such an example, the direction being within the user-facing directional threshold is indicative of wrist pronation to an orientation that is within the user-facing directional threshold. For example, if the wrist on which the wrist worn apparatus is worn is oriented similarly to the orientation of FIG. 3C, the apparatus may determine that the apparatus is oriented in a user-facing direction. In such an example, the apparatus may determine that the wrist worn apparatus is oriented in a direction that is within the user-facing directional threshold.

The user-facing directional threshold may be set according to various objectives and/or display attributes. For example, the user-facing directional threshold may be set such that the display may actually be viewable when the apparatus is oriented at the user-facing directional threshold, but may be viewable in an undesirable manner. For example, the viewing angle at such an orientation may cause difficulty for the user to accurately perceive the information displayed on the display. In at least one example embodiment, the user-facing directional threshold corresponds with a wrist upon which the wrist worn apparatus is worn being at an orientation that is between an anatomical orientation and a horizontally pronated orientation. For example, the user-facing directional threshold may be set to a direction that is indicative of an orientation at a direction that is between the orientation of FIG. 3A and the orientation of FIG. 3B.

In at least one example embodiment, the user-facing directional threshold is indicative of a 45 degree pronated orientation, similarly as described regarding FIG. 3C, FIG. 4C, and/or the like. In such an example, the direction being beyond the user-facing directional threshold is indicative of wrist supination beyond the user-facing directional threshold and/or wrist pronation to a magnitude that is less than a 45 degree pronated orientation. For example, if the wrist on which the wrist worn apparatus is worn is oriented similarly to the orientation of FIG. 3A, the apparatus may determine that the apparatus is oriented in a non-user-facing direction. In such an example, the apparatus may determine that the wrist worn apparatus is oriented in a direction that is beyond the user-facing directional threshold. In such an example, the direction being within the user-facing directional threshold is indicative of wrist pronation to an orientation that is within the user-facing directional threshold. For example, if the wrist on which the wrist worn apparatus is worn is oriented similarly to the orientation of FIG. 3B, the apparatus may determine that the apparatus is oriented in a user-facing direction. In such an example, the apparatus may determine that the wrist worn apparatus is oriented in a direction that is within the user-facing directional threshold.

FIGS. 5A-5F are diagrams illustrating wrist worn apparatus orientation according to at least one example embodiment. The examples of FIGS. 5A-5F are merely examples and do not limit the scope of the claims. For example, configuration of the wrist worn apparatus may vary, orientation of the wrist worn apparatus may vary, elements comprised by the wrist worn apparatus may vary, and/or the like.

There are many manners in which the apparatus may determine the orientation of the wrist worn apparatus. In addition, there may be many manners to determine the orientation of the wrist worn apparatus that are developed in the future. Therefore, the manner in which the wrist worn apparatus determines the orientation of the wrist worn apparatus does not necessarily limit the claims in any way.

For example, the wrist worn apparatus may comprise sensors, such as electrodes, that receive physiological information indicative of nerve impulses, muscle movements, and or the like. In such circumstances, the wrist worn apparatus may evaluate such sensor information to determine the orientation of the wrist worn apparatus. Such sensors may be housed by the wrist worn apparatus at various positions that allow for detection of such physiological information.

In another example, the wrist worn apparatus may be configured to determine direction of gravity with respect to the wrist worn apparatus. For example, the wrist worn apparatus may comprise one or more sensors, such as motion sensors, accelerometers, gyroscopes, and/or the like. In such an example, the wrist worn apparatus may evaluate information received by such sensors to determine the direction of gravity with respect to the wrist worn apparatus. In this manner, the wrist worn apparatus may determine the orientation of the wrist worn apparatus based, at least in part, on the direction of gravity with respect to the wrist worn apparatus.

In at least one example embodiment, the display of the wrist worn apparatus is configured to be oriented on a wrist of a user such that a top of the display is proximate to an ulna of the user and a bottom of the display is proximate to a radius of the user. For example, apparatus 401 of FIGS. 4A-4D may be configured such that the top of the display of apparatus 401 is proximate to the ulna of user 402 and the bottom of the display is proximate to the radius of user 402.

Figure 5A:
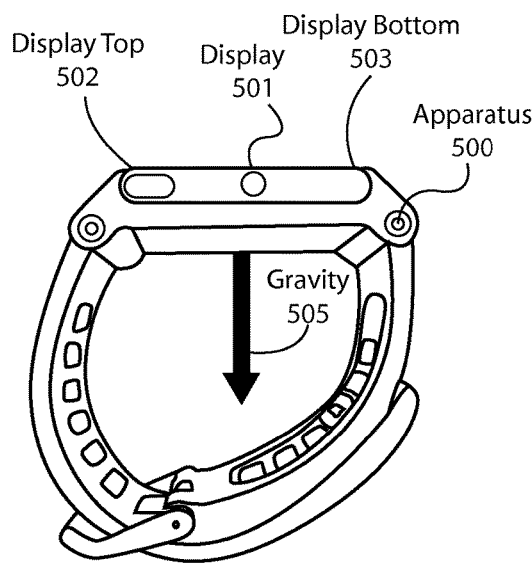
FIGS. 5A-5F are diagrams illustrating wrist worn apparatus orientation according to at least one example embodiment.
Figure 5B:
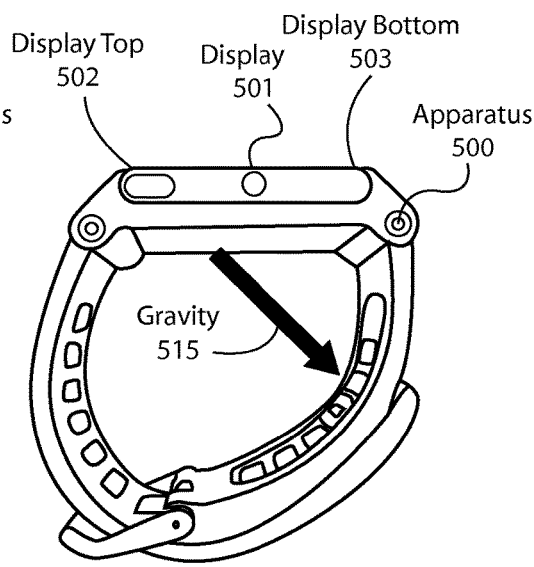
Figure 5C:
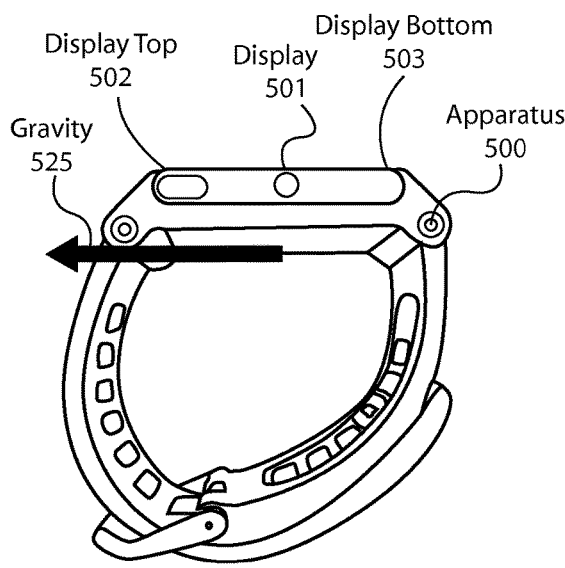
Figure 5D:
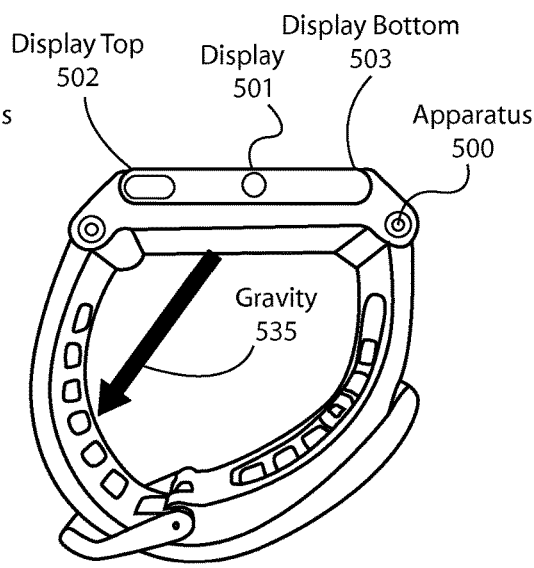
Figure 5E:
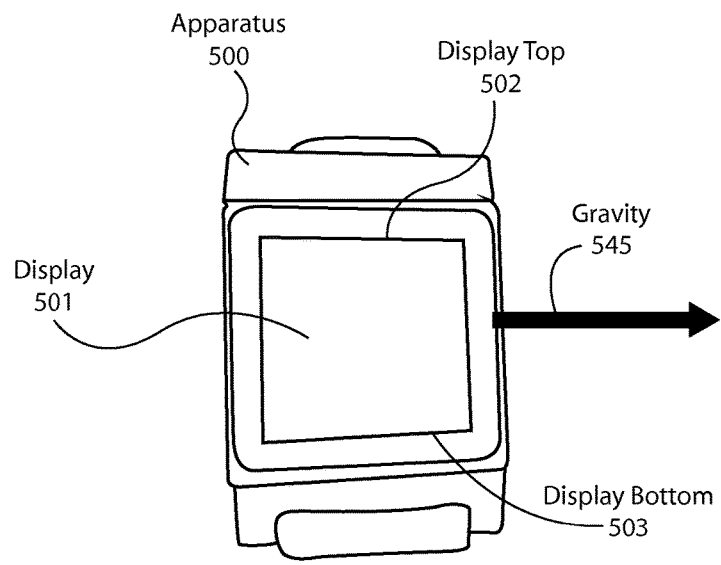
Figure 5F:
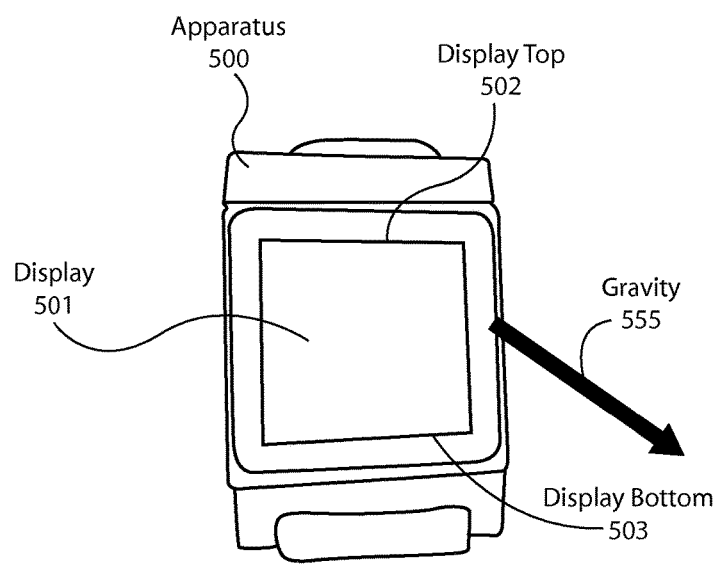

The examples of FIG. 5A-5F illustrate apparatus 500, which comprises display 501. In the examples of FIGS. 5A-5F, display top 502 and display bottom are denoted, and a direction of gravity is illustrated with respect to the apparatus. In the examples of FIG. 5A-5F, display 501 is configured to be oriented on a wrist of a user such that display top 502 is proximate to an ulna of the user and display bottom 503 is proximate to a radius of the user. In at least one example embodiment, a side of the apparatus that is opposite the display is referred to as a back of the apparatus. In the examples of FIGS. 5A-5D, gravity is indicated in reference to the back of apparatus 500. In at least one example embodiment a sideward direction from the apparatus is a direction that is in a direction that has a component that is perpendicular to the top of the display. For example, the sideward direction may be a leftward direction, a rightward direction, and/or the like. In the examples of FIGS. 5E-5F, gravity is indicated in reference to a sideward direction with respect to apparatus 500. Even though the direction of gravity in the examples of FIGS. 5A-5D is described absent description of a sideward component, in some circumstances, such a sideward component may be present. Even though the direction of gravity in the examples of FIGS. 5E-5F is described absent description of a backward component, an upward component, a downward component, and/or the like, in some circumstances, such a backward component, an upward component, a downward component, and/or the like, may be present.

FIG. 5A is a diagram illustrating wrist worn apparatus orientation according to at least one example embodiment. It can be seen that apparatus 500 is oriented such that gravity direction 505 is perpendicular to a back of wrist worn apparatus 500. In at least one example embodiment, gravity being perpendicular to the back of the apparatus is indicative of a horizontal pronated orientation, similarly as described regarding FIG. 3B and/or FIG. 4A.

FIG. 5B is a diagram illustrating wrist worn apparatus orientation according to at least one example embodiment. It can be seen that apparatus 500 is oriented such that gravity direction 515 is in a direction that is between a direction that is perpendicular to a back of apparatus 500 and a direction that is directly downward from display bottom 503. It can be seen that apparatus 500 is oriented such that gravity direction 515 is in a direction that is at a median between a direction that is perpendicular to a back of apparatus 500 and a direction that is directly downward from display bottom 503. In at least one example embodiment, gravity being in a direction that is at a median between a direction that is perpendicular to a back of the apparatus and a direction that is directly downward from a bottom of the display is indicative of a one hundred thirty five degree pronation orientation, similarly as described regarding FIG. 4B.

FIG. 5C is a diagram illustrating wrist worn apparatus orientation according to at least one example embodiment. It can be seen that apparatus 500 is oriented such that gravity direction 525 is directly upward from display top 502. In at least one example embodiment, gravity being directly upward from a top of the display of the apparatus is indicative of an anatomical orientation, similarly as described regarding FIG. 3A.

FIG. 5D is a diagram illustrating wrist worn apparatus orientation according to at least one example embodiment. It can be seen that apparatus 500 is oriented such that gravity direction 535 is in a direction that is between a direction that is perpendicular to a back of apparatus 500 and a direction that is directly upward from display top 502. It can be seen that apparatus 500 is oriented such that gravity direction 535 is in a direction that is at a median between a direction that is perpendicular to a back of apparatus 500 and a direction that is directly upward from display top 502. In at least one example embodiment, gravity being in a direction that is at a median between a direction that is perpendicular to a back of the apparatus and a direction that is directly upward from a top of the display is indicative of a forty five degree pronation orientation, similarly as described regarding FIG. 3C and/or FIG. 4C.

FIG. 5E is a diagram illustrating wrist worn apparatus orientation according to at least one example embodiment. It can be seen that apparatus 500 is oriented such that gravity direction 545 is directly sideward from display 501. In at least one example embodiment, gravity being directly sideward from the display of the apparatus is indicative of a forearm of a wrist upon which the wrist worn apparatus is worn being in an anatomical position, similarly as described regarding FIG. 4D.

FIG. 5F is a diagram illustrating wrist worn apparatus orientation according to at least one example embodiment. It can be seen that apparatus 500 is oriented such that gravity direction 555 is in a direction that is between a direction that is directly sideward from display 501 and a direction that is directly downward from display bottom 503. It can be seen that apparatus 500 is oriented such that gravity direction 535 is in a direction that is forty five degrees from a purely sideward direction. In at least one example embodiment, gravity being in a direction that is forty five degrees from a purely sideward direction is indicative of a forearm orientation that is between the forearm orientation of FIG. 4A and the forearm orientation of FIG. 4D.

As previously described, the apparatus may determine whether the apparatus is oriented in a user-facing direction or a non-user-facing direction based, at least in part, on a user-facing directional threshold. In at least one example embodiment, the user-facing directional threshold is indicative of gravity being in a particular direction with respect to the wrist worn apparatus. In at least one example embodiment, a direction being beyond the user-facing directional threshold is indicative of gravity being in a direction that is upward from the user-facing directional threshold. In at least one example embodiment, a direction being within the user-facing directional threshold is indicative of gravity being in a direction that is downward from the user-facing directional threshold.

In at least one example embodiment, the user-facing directional threshold corresponds with gravity being in a direction that is between perpendicular to a back of the wrist worn apparatus and directly upward from a top of the wrist worn apparatus. In at least one example embodiment, the user-facing directional threshold corresponds with gravity being in a direction that is at a median between perpendicular to a back of the wrist worn apparatus and directly upward from a top of the wrist worn apparatus. For example, the user-facing directional threshold may correspond with gravity direction 535 of FIG. 5D. In such an example, gravity being in a direction that is upward from gravity direction 535 is indicative of a non-user-facing direction. For example, gravity direction 525 of FIG. 5C may be considered as upward from gravity direction 535. As such, in such an example, the orientation illustrated in FIG. 5C may be determined to be in a non-user-facing direction. Similarly, in such an example, gravity being in a direction that is downward from gravity direction 535 is indicative of a user-facing direction. For example, gravity direction 505 of FIG. 5A, and gravity direction 515 of FIG. 5B may be considered as downward from gravity direction 535. As such, in such an example, the orientations illustrated in FIG. 5A and FIG. 5B may be determined to be in a user-facing direction.

In at least one example embodiment, a gravity direction that is frontward of the apparatus is indicative of the apparatus being in a non-user-facing direction. For example, the display of the apparatus being oriented in such a downward facing direction may be inconsistent with the user being able to view the apparatus. For example, when the user is postured such that the user's wrist is below the eyes of the user, there may be an absence of a direct line of sight from the eyes of the user to the display when the display is oriented in a downward direction. In at least one example embodiment, a direction being beyond the user-facing directional threshold is indicative of gravity being in a direction that is frontward from the display of the apparatus.

Figure 6A:
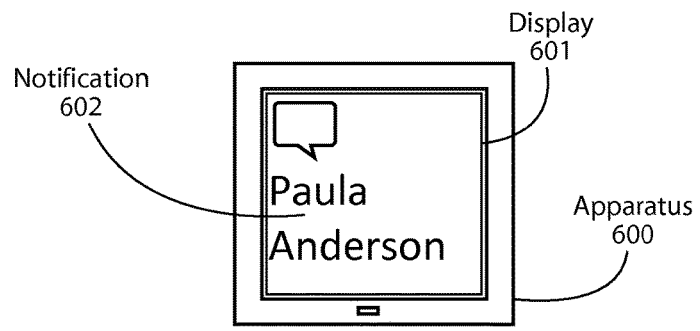
FIGS. 6A-6C are diagrams illustrating a notification according to at least one example embodiment.
Figure 6B:
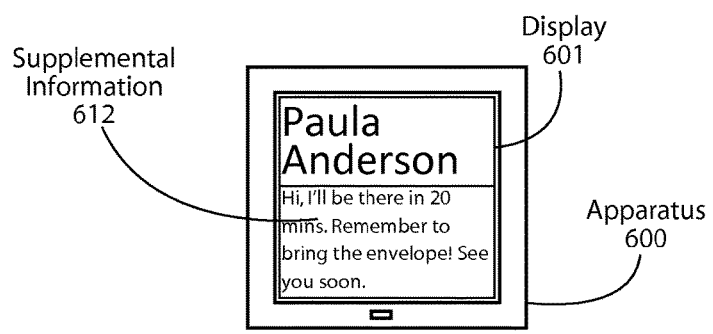
Figure 6C:
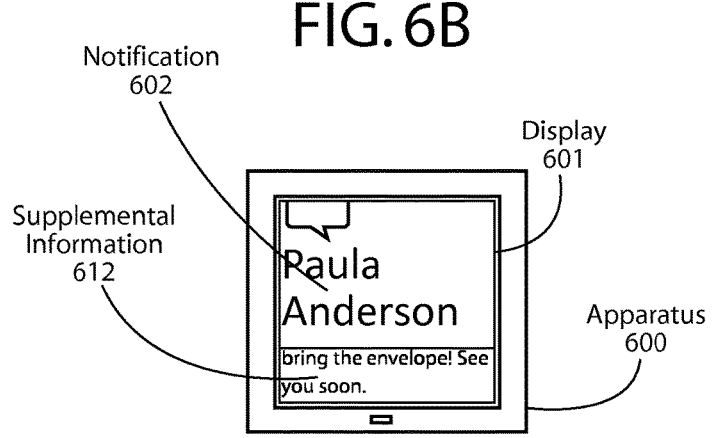

FIGS. 6A-6C are diagrams illustrating a notification according to at least one example embodiment. The examples of FIGS. 6A-6C are merely examples and do not limit the scope of the claims. For example, content of the notification may vary, visual representation of the notification may vary, orientation of the notification may vary, and/or the like.

In some circumstances, a user may have difficulty interacting with a wrist worn apparatus in the same manner in which the user would interact with a desktop computer, a laptop computer, a tablet computer, or even a handheld computer. For example, by virtue of the wrist worn apparatus being worn on the wrist of the user, the user may be unable to comfortably touch the wrist worn apparatus with the hand of the wrist upon which the wrist worn apparatus is worn. In this manner, it may be desirable to provide for input that does not necessarily involve touching of the apparatus, such as touching at a touch sensor, touching to actuate a button, and/or the like.

In at least one example embodiment, the apparatus determines that tilting of the apparatus is an input. For example, a software event may occur, and the apparatus may determine the manner in which to respond to the software event based, at least in part, on tilting of the apparatus. In at least one example embodiment, the apparatus determines occurrence of a software event. In at least one example embodiment, the software event is receipt of a message. In such an example, the determination of the occurrence of the software event may comprise receipt of the message. In at least one example embodiment, the software event is occurrence of a calendar event. Such a calendar event may be associated with a calendar entry. In such an example, the determination of the occurrence of the software event may comprise determination that a current time corresponds with an occurrence time of the calendar entry. In at least one example embodiment, the software event is a receipt of a call. In such an example, the determination of the occurrence of the software event may comprise receipt of the call.

In many circumstances, a wrist worn apparatus is involved in a large amount of movement as the user performs various physical activities. As such, it may be desirable to avoid determining that such physical activity movements are inputs. In this manner, it may be desirable to base inputs on particular movements that indicate a manner of user interaction with the apparatus. For example, in many circumstances, the user interacts with the apparatus by viewing the display. In this manner, the user interaction with the apparatus may often involve the apparatus being oriented in a user-facing direction. In this manner, it may be desirable to determine operations to be performed by the apparatus in response to tilting movement of the apparatus in reference to a user-facing direction of the apparatus. For example, it may be desirable to avoid performing operations based on tilting of the apparatus that fails to involve a user-facing orientation of the apparatus. In such an example, such lack of a user-facing orientation may be indicative of movement performed by the user that fails to involve interaction with the apparatus.

In at least one example embodiment, the apparatus ignores information indicative of tilting of the apparatus that occurs prior to the apparatus being oriented in a user-facing direction. For example, the apparatus may determine one or more operations to perform based, at least in part, on tilting of the apparatus subsequent to the apparatus being oriented in a user-facing direction. In such an example, the apparatus may exclude information indicative of tilting of the apparatus prior to the apparatus being in a user-facing direction.

As previously described, the apparatus may determine occurrence of a software event, such as receipt of a message, occurrence of a calendar event, receipt of a call, and/or the like. In such an example, the apparatus may determine a notification to be rendered based, at least in part, on the software event. In this manner, the notification may comprise information indicative of the software event. For example, in circumstances where the software event is receipt of a message, the notification may comprise information indicative of a sender of the message, such as contact information, name information, address information, phone number information, and/or the like. In another example, in circumstances where the software event is occurrence of a calendar event, the notification may comprise information indicative of a title of the calendar entry, an occurrence time of the calendar entry, and/or the like. In still another example, in circumstances where the software event is receipt of a call, the notification may comprise information indicative of a caller of the call, information indicative that a call in is being received, information indicative that a call has been received, and/or the like. The information indicative of a caller of the call may be any information that indicates the caller, such as contact information, name information, address information, phone number information, and/or the like.

In at least one example embodiment, the notification comprises a visual notification, an audible notification, a tactile notification, and/or the like. A visual notification may comprise visual information indicative of the notification. For example the visual indication may comprise text information, graphical information, video information, and/or the like. An audible notification may comprise audible information indicative of the notification. For example, the audible notification may comprise audible speech information, music information, tone information, or any other information that corresponds with a sound that may be actuated by an apparatus. A tactile notification may comprise tactile information indicative of the notification. For example, the tactile notification may be information that defines a vibration signal, a texture, a temperature, and/or the like.

In at least one example embodiment, causation of rendering of the notification comprises causation of display of a visual notification, causation of actuation of an audible notification, causation of actuation of a tactile notification, and/or the like. In at least one example embodiment, actuation of an audible notification comprises causation of actuation of an audio transducer, such as a speaker, such that the transducer generates an audio signal that corresponds with the audible notification. For example, the audible notification may be a song, and the actuation of the song may comprise sending information indicative of the song to a speaker such that the speaker generates an audio signal that corresponds with the song. In at least one example embodiment, actuation of a tactile notification comprises actuation of a tactile transducer, such as a vibration transducer, a heating element, a cooling element, an electromechanically controlled apparatus deformation, an electromechanically controlled texture, and/or the like. For example, the tactile notification may be a vibration signal that signifies the software event. In such an example, the rendering of the tactile notification may comprise actuation of a vibration transducer in a manner that corresponds with the vibration signal such that the user may perceive the vibration signal.

FIG. 6A is a diagram illustrating a visual notification according to at least one example embodiment. In the example of FIG. 6A, apparatus 600 is displaying visual notification 602 on display 601. It can be seen that visual notification 602 comprises a speech bubble image above a person's name. In this manner, visual notification 602 signifies receipt of a message. For example, visual notification 602 may signify a software event of apparatus 600 receiving a message that was sent from Paula Anderson.

In many circumstances, the user may evaluate the information of the notification to determine how the user wants to react to the notification. In many circumstances, the user may view the display to evaluate visual information of the notification. In this manner, the user may orient the apparatus in a user-facing direction to view the information of the notification. In this manner, it may be desirable for the apparatus to evaluate tilting of the apparatus as an input subsequent to the user orienting the apparatus in a manner that indicates that the user is evaluating visual information of the notification. Therefore, it may be desirable to determine operations to be performed based, at least in part, on tilting of the apparatus subsequent to the apparatus becoming oriented in a user-facing direction.

In some circumstances, even though the user may be viewing the apparatus when the apparatus is oriented in a user-facing direction, the user may tilt the apparatus without necessarily intending to perform an input. For example, the user may be viewing the display while walking, while riding a bicycle, while running, and/or the like. In this manner, the user may be performing a physical activity, while viewing the apparatus, which may involve tilting of the apparatus absent any user intent to perform an input, or to invoke any particular operations. Therefore, it may be desirable for the apparatus to avoid determining operations based on tilting of the apparatus that the user fails to intend as input.

In many circumstances, even if the user is performing an activity that causes the apparatus to tilt while the user is viewing the display of apparatus, the user will often avoid tilting the apparatus to an extent where the user can no longer view the display of the apparatus. In this manner, the user tilting the apparatus from a user-facing direction to a non-user-facing direction may indicate that the user is performing an intentional tilting of the apparatus. In this manner, it may be desirable for the apparatus to determine operations to perform based, at least in part, on the apparatus being tilted from a user-facing direction to a non-user-facing direction.

In some circumstances, the user may desire to no longer view the display of the apparatus. In this manner, the tilting from the user-facing direction to the non-user-facing direction may indicate that the user no longer desires to view the display of the apparatus. However, in some circumstances, it may be desirable for the tilting of the apparatus from the user-facing direction to the non-user-facing direction to be a part of a particular input. For example, the tilting from the user-facing direction to the non-user-facing direction may be indicative of an intentional tilting by the user that pertains to the user's interaction with the apparatus. In this manner, such tilting may be indicative of an intentional interaction by the user.

In some circumstances, the apparatus may receive information indicative of the apparatus being tilted from a user-facing direction to a non-user-facing direction, followed by the apparatus being tilted from a non-user-facing direction to a user-facing direction. In such circumstances, it may be desirable for the apparatus to determine that such information is an intentional input performed by the user. In some circumstances, it may be desirable to determine the user's intent based, at least in part, on the tilting from a user-facing direction to a non-user-facing direction and the tilting from a non-user-facing direction to a user-facing direction to occur within a predetermined duration of time. For example, it may be desirable for the predetermined duration to be one second, one half of a second, and/or the like. In this manner, the user may interpret the tilting from a user-facing direction to a non-user-facing direction, followed by the tilting from a non-user-facing direction to a user-facing direction to be parts of the same gesture.

In such circumstances, when the wrist worn apparatus has rendered the notification, the tilting from a user-facing direction to a non-user-facing direction and the tilting from a non-user-facing direction to a user-facing direction to occur within the predetermined duration of time may be interpreted as a notification tilt actuation input. In at least one example embodiment, the notification tilt actuation input is an input that signifies a user's desire to actuate an operation associated with the notification, such as performing operations associated with the software event signified by the notification.

In at least one example embodiment, subsequent to rendering a notification associated with a software event, a wrist worn apparatus may determine one or more operations to be performed based, at least in part, on a determination that the wrist worn apparatus has been tilted from a non-user-facing direction to a user-facing direction within a notification tilt actuation threshold duration from the determination that the wrist worn apparatus has been tilted from the user-facing direction to the non-user-facing direction. In at least one example embodiment, the notification tilt actuation threshold duration is a time duration within which a determination that the wrist worn apparatus has been tilted from a non-user-facing direction to a user-facing direction subsequent to the determination that the wrist worn apparatus has been tilted from the user-facing direction to the non-user-facing direction will be interpreted as a notification actuation input, will cause performance of operations associated with the software event, and/or the like. For example, the notification tilt actuation threshold duration may be one second, one half of one second, and/or the like.

In at least one example embodiment, the apparatus causes performance of at least one operation associated with the software event. Such causation may be based, at least in part, on the determination that the wrist worn apparatus has been tilted from the non-user-facing direction to the other user-facing direction within the notification tilt actuation threshold duration from the determination that the wrist worn apparatus has been tilted from the user-facing direction to the non-user-facing direction. For example, the apparatus may avoid performance of the operations associated with the software event based, at least in part, on absence of the determination that the wrist worn apparatus has been tilted from the non-user-facing direction to the other user-facing direction within the notification tilt actuation threshold duration from the determination that the wrist worn apparatus has been tilted from the user-facing direction to the non-user-facing direction. In this manner, the user may invoke performance of the operations associated with the software event by way of the notification tilt actuation input.

In some circumstances, the operations associated with the software event may govern the manner in which the apparatus responds to the software event. For example, the software event may be receipt of a phone call. In such an example, the operation associated with the software event may comprise answering of the call, rejection of the call, and/or the like. In this manner, the user may invoke rejection of the call, answering of the call, and/or the like, by way of the notification tilt actuation input.

In at least one example embodiment, performance of one or more operations associated with the software event comprises determination of supplemental information associated with the software event, and causation of rendering of, at least part of, the supplemental information. In this manner, the user may invoke rendering of the supplemental information by way of the notification tilt actuation input. In at least one example embodiment, the supplemental information comprises at least one of visual supplemental information, audible supplemental information, or tactile supplemental information. In at least one example embodiment, the supplemental information is information associated with the software event that the notification fails to indicate. In this manner, the notification excludes the supplemental information. In circumstances where the software event is receipt of a message, the supplemental information may be information that is omitted from the notification. In at least one example embodiment, the supplemental information is, at least part of, a body of the message. In circumstances where the software event is occurrence of a calendar event, the supplemental information may be information that is omitted from the notification. In at least one example embodiment, the supplemental information is, at least part of, a body of the calendar entry. For example, the calendar entry may comprise information indicative of a location, a calendar entry description, and/or the like. In such an example, the supplemental information may comprise information indicative of the location, the calendar entry description, and/or the like.

FIG. 6B is a diagram illustrating supplemental information according to at least one example embodiment. In the example of FIG. 6B, visual supplemental information 612 is associated with the message of visual notification 602 of FIG. 6A. In the example of FIG. 6A, visual supplemental information 612 is, at least part of, the body of the message. In the example of FIG. 6B, the user has performed a notification tilt actuation input subsequent to display of visual notification 602, to cause the apparatus to perform the operations of determining visual supplemental information 612 and displaying of visual supplemental information 612. It can be seen that a portion of the information comprised by visual notification 602 is displayed above visual supplemental information 612. In some circumstances, such display of visual notification information proximate to the supplemental information may be desirable to allow the user to better understand the context of the supplemental information.

In some circumstances, it may be desirable for the apparatus to display an animation that is indicative of a transition from the display of the visual notification to the display of the visual supplemental information. For example, it may be desirable to provide the animation to allow the user to better understand that the transition is occurring, that the notification tilt actuation input has been determined by the apparatus, and/or the like. In at least one example embodiment, the apparatus causes display of an animation indicative of a transition from display of the visual notification to display of the visual supplemental information.

In some circumstances, it may be desirable for the animation to correspond with the tilting of the notification tilt actuation input. For example, prior to completion of the notification tilt actuation input, the apparatus may determine that the wrist worn apparatus is tilting from the non-user-facing direction towards the user-facing direction, wherein the causation of display of the animation is based, at least in part, on the determination that the wrist worn apparatus is tilting from the non-user-facing direction towards the user-facing direction. In such an example, the causation of display of the animation may comprise determination of a current tilt direction of the wrist worn apparatus. For example, the current tilt direction of the wrist worn apparatus may be the orientation of the wrist worn apparatus during the tilting from the non-user-facing direction towards the user-facing direction. In such an example, the apparatus may determine a tilt progression percentage that represents the tilt direction as a percentage difference between the non-user-facing direction and the user-facing direction. In such an example the tilt progression percentage may be determined such that zero percent is indicative of the current tilt direction being equal to the non-user-facing direction and 100 percent is indicative of the current tilt angle being equal to the user-facing direction. In such an example, the apparatus may determine a frame of the animation that corresponds with an animation progress percentage that is equivalent to the tilt progression percentage. In this manner, the speed of the animation may be controlled by the speed of the tilting.

In some circumstances, even though the apparatus may have begun display of the animation, the apparatus may determine that the notification tilt actuation threshold duration has elapsed prior to the wrist worn apparatus becoming tilted to a user-facing direction. In at least one example embodiment, the apparatus determines that the notification tilt actuation threshold duration has elapsed since the determination that the wrist worn apparatus has been tilted from the user-facing direction to the non-user-facing direction. In such an example, the apparatus may terminate display of the animation based, at least in part, on the determination that the notification tilt actuation threshold duration has elapsed since the determination that the wrist worn apparatus has been tilted from the user-facing direction to the non-user-facing direction.

In some circumstances, it may be desirable to reverse the animation subsequent to the determination that the notification tilt actuation threshold duration has elapsed since the determination that the wrist worn apparatus has been tilted from the user-facing direction to the non-user-facing direction. In such an example, the apparatus may reverse progression of the animation until a start frame of the animation is displayed. In such an example, the apparatus may cause display of the visual notification absent the animation subsequently to display of the start frame of the animation.

FIG. 6C is a diagram illustrating an animation indicative of a transition from display of visual notification 602 to display of visual supplemental information 612, according to at least one example embodiment. It can be seen that the animation indicates visual notification 602 sliding upward to reveal visual supplemental information 612. In this manner, the animation may help the user to understand that the transition is occurring, that the notification tilt actuation input has been determined by the apparatus, and/or the like.

Figure 7:
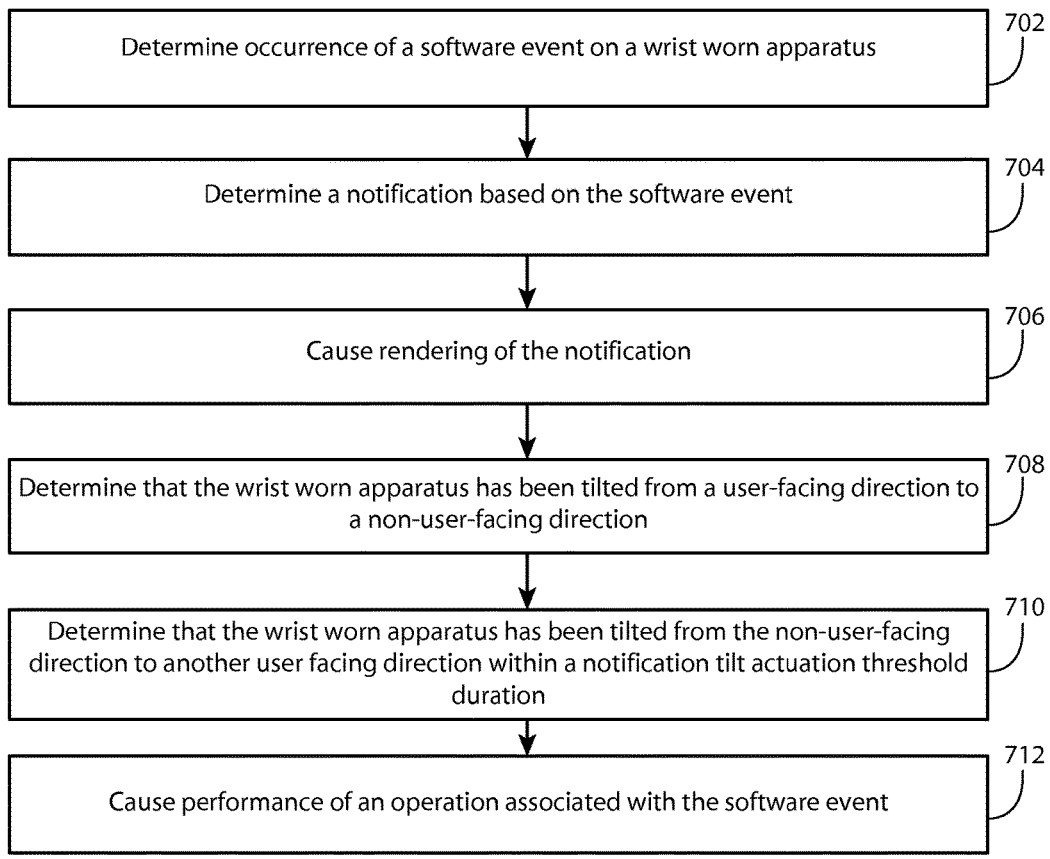
FIG. 7 is a flow diagram illustrating activities associated with performance of an operation based, at least in part, on tilt of a wrist worn apparatus according to at least one example embodiment.

FIG. 7 is a flow diagram illustrating activities associated with performance of an operation based, at least in part, on tilt of a wrist worn apparatus according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG.

1, comprising computer code configured to, working with a processor, for example processor 11 of FIG. 1, cause the apparatus to perform set of operations of FIG. 7.

At block 702, the apparatus determines occurrence of a software event on a wrist worn apparatus. The determination, the occurrence, the software event, and the wrist worn apparatus may be similar as described regarding FIGS. 5A-5F and FIGS. 6A-6C.

At block 704, the apparatus determines a notification based, at least in part, on the software event such that the notification comprises information that signifies the software event. The determination, the notification, and the information may be similar as described regarding FIGS. 6A-6C.

At block 706, the apparatus causes rendering of the notification. The rendering of the notification may be similar as described regarding FIGS. 6A-6C.

At block 708, the apparatus determines that the wrist worn apparatus has been tilted from a user-facing direction to a non-user-facing direction. The determination, the tilt, the user-facing direction, and the non-user-facing direction may be similar as described regarding FIGS. 4A-4D and FIGS. 5A-5F.

At block 710, the apparatus determines that the wrist worn apparatus has been tilted from the non-user-facing direction to another user-facing direction within a notification tilt actuation threshold duration from the determination that the wrist worn apparatus has been tilted from the user-facing direction to the non-user-facing direction. The determination, the other user-facing direction, and the tilt actuation threshold duration may be similar as described regarding FIGS. 4A-4D, FIGS. 5A-5F, and FIGS. 6A-6C.

At block 712, the apparatus causes performance of at least one operation associated with the software event. The performance and the operation may be similar as described regarding FIGS. 6A-6C. In this manner, the causation of performance of at least one operation associated with the software event may be based, at least in part, on the determination that the wrist worn apparatus has been tilted from the non-user-facing direction to the other user-facing direction within the notification tilt actuation threshold duration from the determination that the wrist worn apparatus has been tilted from the user-facing direction to the non-user-facing direction.

Figure 8:
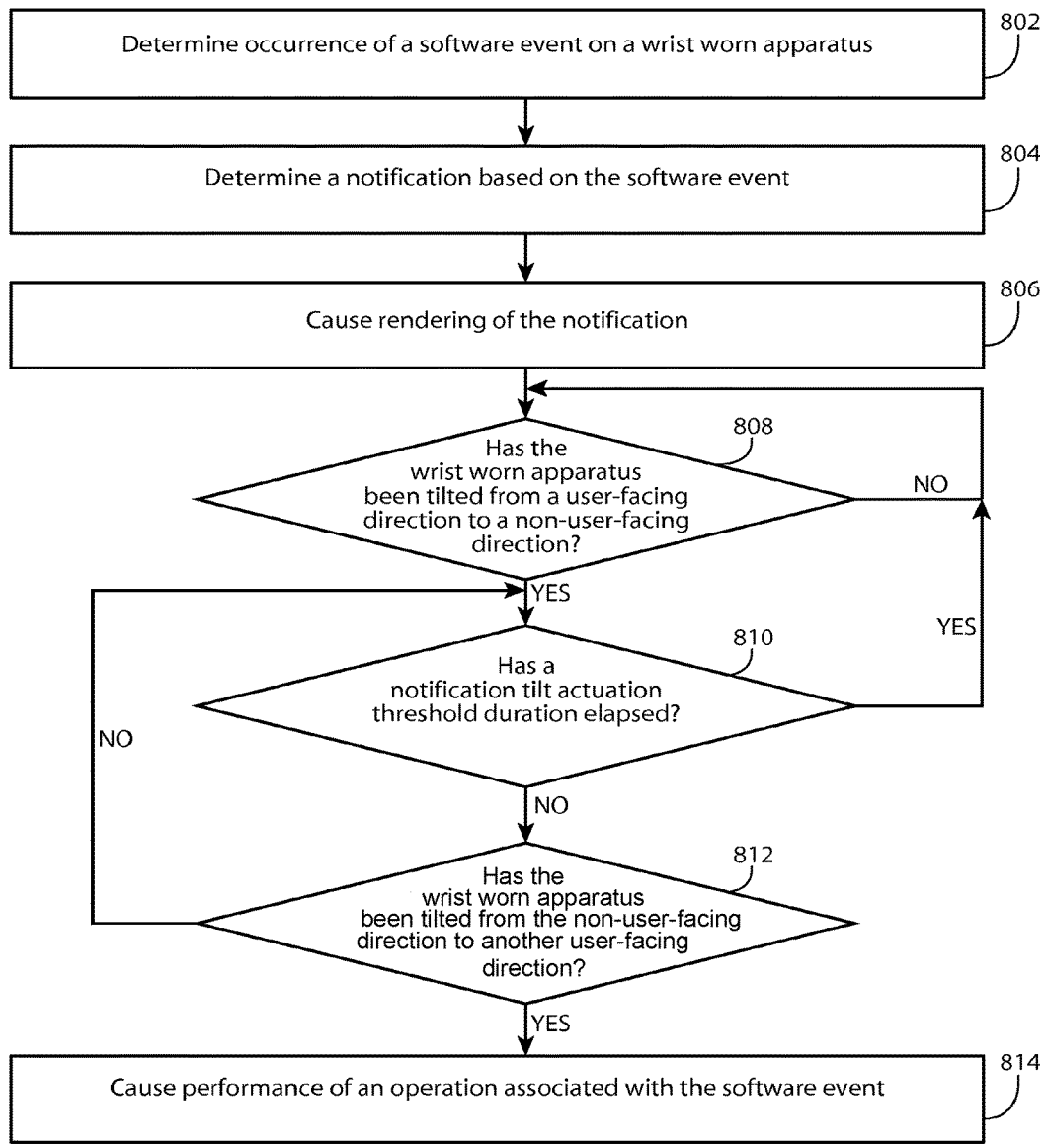
FIG. 8 is a flow diagram illustrating activities associated with performance of an operation based, at least in part, on tilt of a wrist worn apparatus according to at least one example embodiment.

FIG. 8 is a flow diagram illustrating activities associated with performance of an operation based, at least in part, on tilt of a wrist worn apparatus according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, it may be desirable to avoid performance of one or more operations associated with the software event absent receipt of a notification tilt actuation input.

At block 802, the apparatus determines occurrence of a software event on a wrist worn apparatus, similarly as described regarding block 702 of FIG. 7. At block 804, the apparatus determines a notification based, at least in part, on the software event such that the notification comprises information that signifies the software event, similarly as described regarding block 704 of FIG. 7. At block 806, the apparatus causes rendering of the notification, similarly as described regarding block 706 of FIG. 7.

At block 808, the apparatus determines whether the wrist worn apparatus has been tilted from a user-facing direction to a non-user-facing direction. The determination, the tilt, the user-facing direction, and the non-user-facing direction may be similar as described regarding FIGS. 4A-4D and FIGS. 5A-5F. If the apparatus determines that the wrist worn apparatus has been tilted from a user-facing direction to a non-user-facing direction, flow proceeds to block 810. If the apparatus determines that the wrist worn apparatus has failed to be tilted from a user-facing direction to a non-user-facing direction, flow returns to block 808. In this manner, the apparatus may repeat block 808 until the apparatus determines that the wrist worn apparatus has been tilted from a user-facing direction to a non-user-facing direction.

At block 810, the apparatus determines whether a notification tilt actuation threshold duration has elapsed. The determination and the notification tilt actuation threshold duration may be similar as described regarding FIGS. 6A-6C. If the apparatus determines that the notification tilt actuation threshold duration has failed to elapse, flow proceeds to block 812. If the apparatus determines that the notification tilt actuation threshold duration has elapsed, flow returns to block 808. In this manner, the apparatus may avoid performance of the operation associated with the software event based, at least in part, on the determination that the notification tilt actuation threshold duration has elapsed.

At block 812, the apparatus determines whether the wrist worn apparatus has been tilted from the non-user-facing direction to another user-facing direction. The determination, and the other user-facing direction may be similar as described regarding FIGS. 4A-4D, FIGS. 5A-5F, and FIGS. 6A-6C. If the apparatus determines that the wrist worn apparatus has been tilted from the non-user-facing direction to another user-facing direction, flow proceeds to block 814. If the apparatus determines that the wrist worn apparatus has failed to be tilted from the non-user-facing direction to another user-facing direction, flow proceeds to block 810. In this manner, the apparatus may avoid performance of the operation associated with the software event based, at least in part, on the determination that the wrist worn apparatus has failed to be tilted from the non-user-facing direction to another user-facing direction.

At block 814, the apparatus causes performance of at least one operation associated with the software event, similarly as described regarding block 712 of FIG. 7.

Figure 9:
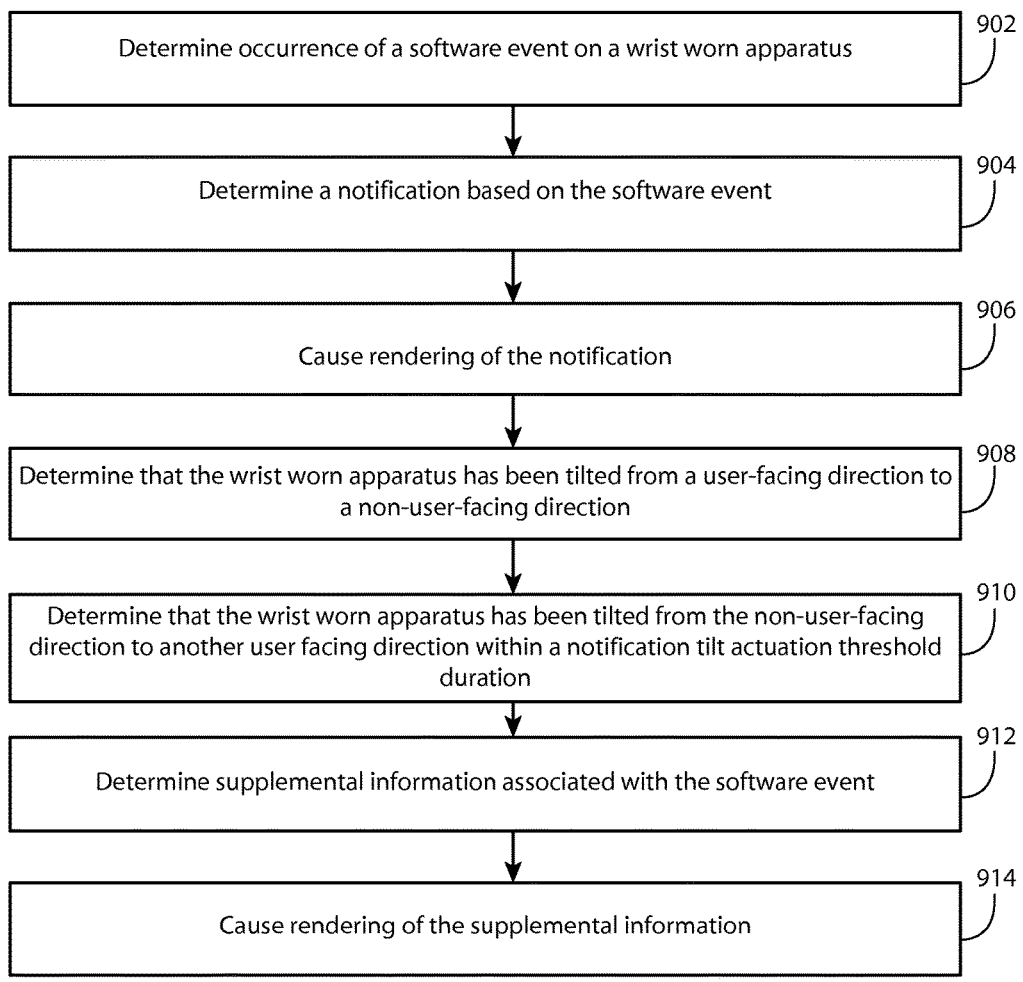
FIG. 9 is a flow diagram illustrating activities associated with performance of an operation based, at least in part, on tilt of a wrist worn apparatus according to at least one example embodiment.

FIG. 9 is a flow diagram illustrating activities associated with performance of an operation based, at least in part, on tilt of a wrist worn apparatus according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, in some circumstances, the operations associated with the software event may comprise rendering of supplemental information associated with the software event.

At block 902, the apparatus determines occurrence of a software event on a wrist worn apparatus, similarly as described regarding block 702 of FIG. 7. At block 904, the apparatus determines a notification based, at least in part, on the software event such that the notification comprises information that signifies the software event, similarly as described regarding block 704 of FIG. 7. At block 906, the apparatus causes rendering of the notification, similarly as described regarding block 706 of FIG. 7. At block 908, the apparatus determines that the wrist worn apparatus has been tilted from a user-facing direction to a non-user-facing direction, similarly as described regarding block 708 of FIG. 7. At block 910, the apparatus determines that the wrist worn apparatus has been tilted from the non-user-facing direction to another user-facing direction within a notification tilt actuation threshold duration from the determination that the wrist worn apparatus has been tilted from the user-facing direction to the non-user-facing direction, similarly as described regarding block 710 of FIG. 7.

At block 912, the apparatus determines supplemental information associated with the software event. The determination and the supplemental information may be similar as described regarding FIGS. 6A-6C.

At block 914, the apparatus causes rendering of, at least part of, the supplemental information. The rendering may be similar as described regarding FIGS. 6A-6C.

Figure 10:
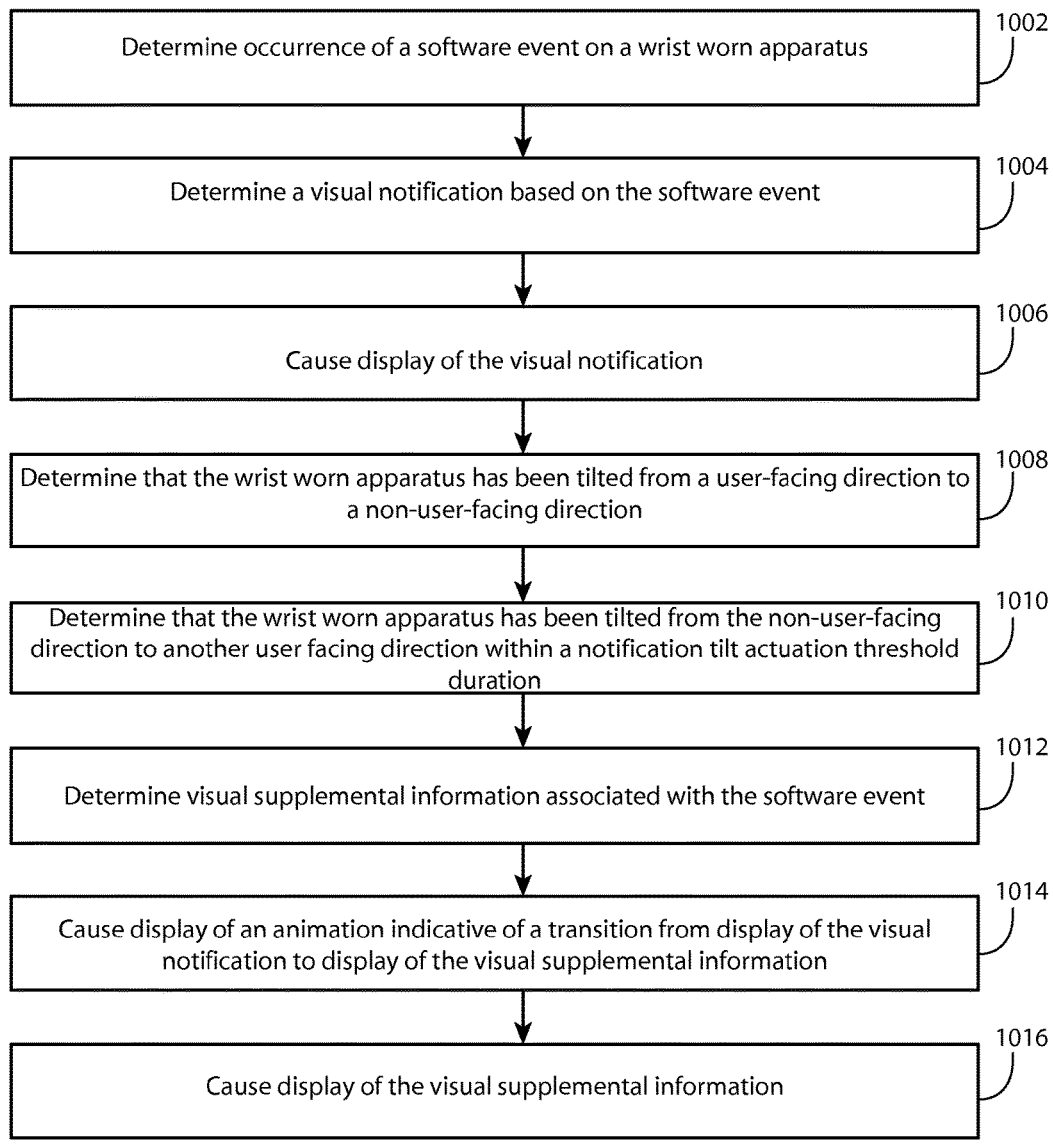
FIG. 10 is a flow diagram illustrating activities associated with performance of an operation based, at least in part, on tilt of a wrist worn apparatus according to at least one example embodiment.

FIG. 10 is a flow diagram illustrating activities associated with performance of an operation based, at least in part, on tilt of a wrist worn apparatus according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously described, in some circumstances, it may be desirable to provide an animation that signifies the transition from display of the visual notification to display of the visual supplemental information.

At block 1002, the apparatus determines occurrence of a software event on a wrist worn apparatus, similarly as described regarding block 702 of FIG. 7. At block 1004, the apparatus determines a visual notification based, at least in part, on the software event such that the visual notification comprises information that signifies the software event. The determination, the visual notification, and the information may be similar as described regarding FIGS. 6A-6C.

At block 1006, the apparatus causes display of the visual notification. The display of the visual notification may be similar as described regarding FIGS. 6A-6C.

At block 1008, the apparatus determines that the wrist worn apparatus has been tilted from a user-facing direction to a non-user-facing direction, similarly as described regarding block 708 of FIG. 7. At block 1010, the apparatus determines that the wrist worn apparatus has been tilted from the non-user-facing direction to another user-facing direction within a notification tilt actuation threshold duration from the determination that the wrist worn apparatus has been tilted from the user-facing direction to the non-user-facing direction, similarly as described regarding block 710 of FIG. 7.

At block 1012, the apparatus determines visual supplemental information associated with the software event. The determination and the visual supplemental information may be similar as described regarding FIGS. 6A-6C.

At block 1014, the apparatus causes display of an animation indicative of a transition from display of the visual notification to display of the visual supplemental information. The display and the animation may be similar as described regarding FIGS. 6A-6C.

At block 1016, the apparatus causes display of, at least part of, the visual supplemental information. The display of the visual supplemental information may be similar as described regarding FIGS. 6A-6C.

Figure 11:
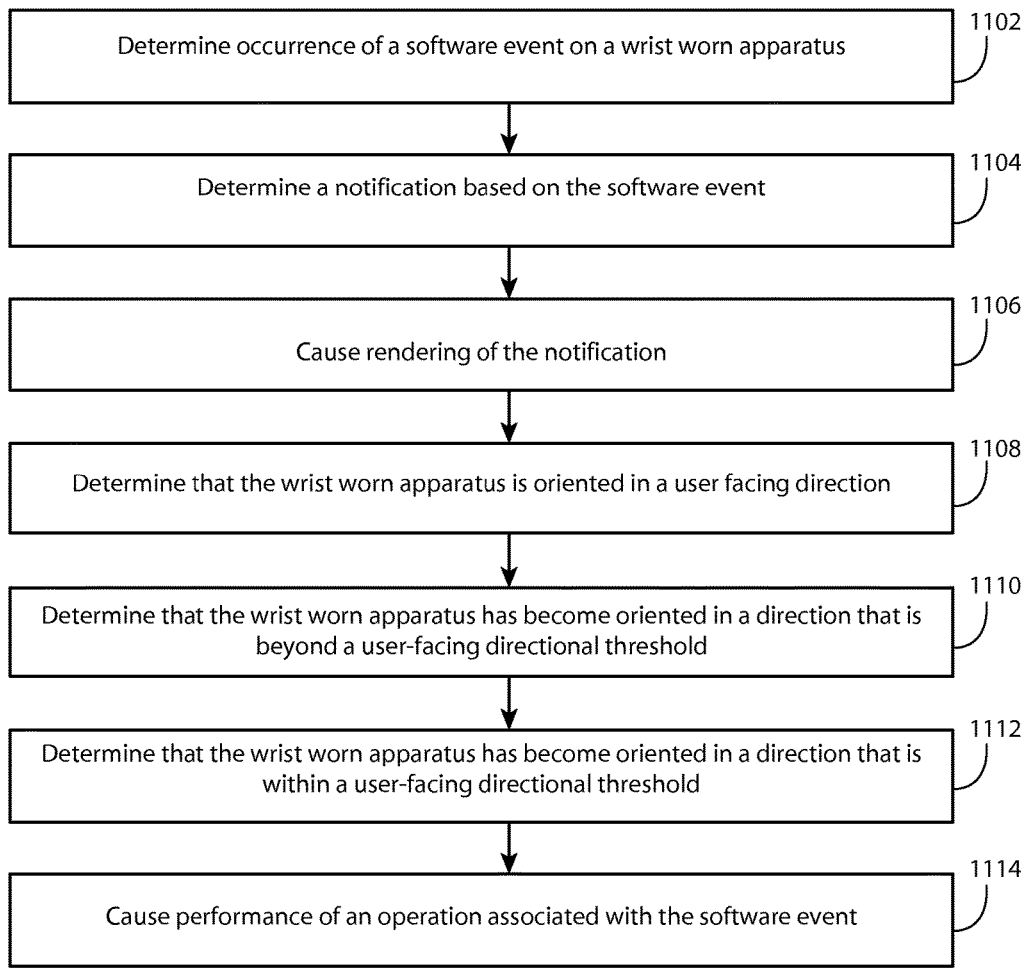
FIG. 11 is a flow diagram illustrating activities associated with performance of an operation based, at least in part, on tilt of a wrist worn apparatus according to at least one example embodiment.

FIG. 11 is a flow diagram illustrating activities associated with performance of an operation based, at least in part, on tilt of a wrist worn apparatus according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As previously described, it may be desirable to determine whether an orientation of the apparatus is in a user-facing direction based, at least in part, on a user-facing directional threshold.

At block 1102, the apparatus determines occurrence of a software event on a wrist worn apparatus, similarly as described regarding block 702 of FIG. 7. At block 1104, the apparatus determines a notification based, at least in part, on the software event such that the notification comprises information that signifies the software event, similarly as described regarding block 704 of FIG. 7. At block 1106, the apparatus causes rendering of the notification, similarly as described regarding block 706 of FIG. 7.

At block 1108, the apparatus determines that the wrist worn apparatus is oriented in a user-facing direction. The determination and the user-facing direction may be similar as described regarding FIGS. 4A-4D and FIGS. 5A-5F.

At block 1110, the apparatus determines that the wrist worn apparatus has become oriented in a direction that is beyond a user-facing directional threshold. The determination and the user-facing directional threshold may be similar as described regarding FIGS. 4A-4D and FIGS. 5A-5F.

At block 1112, the apparatus determines that the wrist worn apparatus has become oriented in a direction that is within a user-facing directional threshold. The determination may be similar as described regarding FIGS. 4A-4D and FIGS. 5A-5F.

At block 1114, the apparatus causes performance of at least one operation associated with the software event, similarly as described regarding block 712 of FIG. 7.

Figure 12:
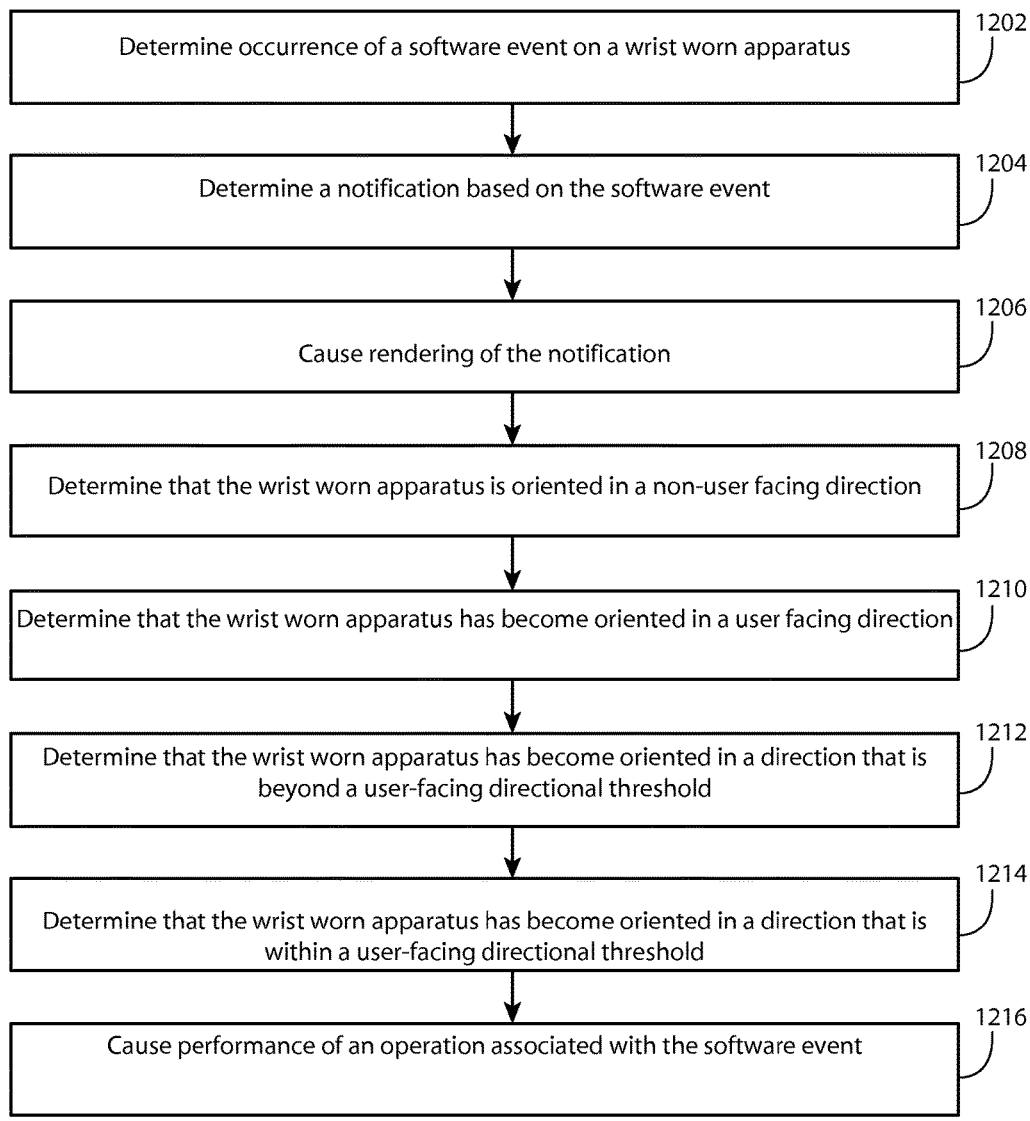
FIG. 12 is a flow diagram illustrating activities associated with performance of an operation based, at least in part, on tilt of a wrist worn apparatus according to at least one example embodiment.

FIG. 12 is a flow diagram illustrating activities associated with performance of an operation based, at least in part, on tilt of a wrist worn apparatus according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

As previously described, it may be desirable to avoid determining that tilt of the apparatus is indicative of an input prior to the apparatus being oriented in a user-facing direction.

At block 1202, the apparatus determines occurrence of a software event on a wrist worn apparatus, similarly as described regarding block 702 of FIG. 7. At block 1204, the apparatus determines a notification based, at least in part, on the software event such that the notification comprises information that signifies the software event, similarly as described regarding block 704 of FIG. 7. At block 1206, the apparatus causes rendering of the notification, similarly as described regarding block 706 of FIG. 7.

At block 1208, the apparatus determines that the wrist worn apparatus is oriented in another non-user-facing direction. The determination and the non-user-facing direction may be similar as described regarding FIGS. 4A-4D and FIGS. 5A-5F.

At block 1210, the apparatus determination that the wrist worn apparatus has become oriented in the user-facing direction. The determination and the user-facing direction may be similar as described regarding FIGS. 4A-4D and FIGS. 5A-5F. In this manner the determination that the wrist worn apparatus has been tilted from the user-facing direction to the non-user-facing direction may be predicated by the determination that the wrist worn apparatus is oriented in the other non-user-facing direction.

At block 1212, the apparatus determines that the wrist worn apparatus has become oriented in a direction that is beyond a user-facing directional threshold, similarly as described regarding block 1110 of FIG. 11. At block 1214, the apparatus determines that the wrist worn apparatus has become oriented in a direction that is within a user-facing directional threshold, similarly as described regarding block 1112 of FIG. 11. At block 1216, the apparatus causes performance of at least one operation associated with the software event, similarly as described regarding block 712 of FIG. 7.

Figure 13:
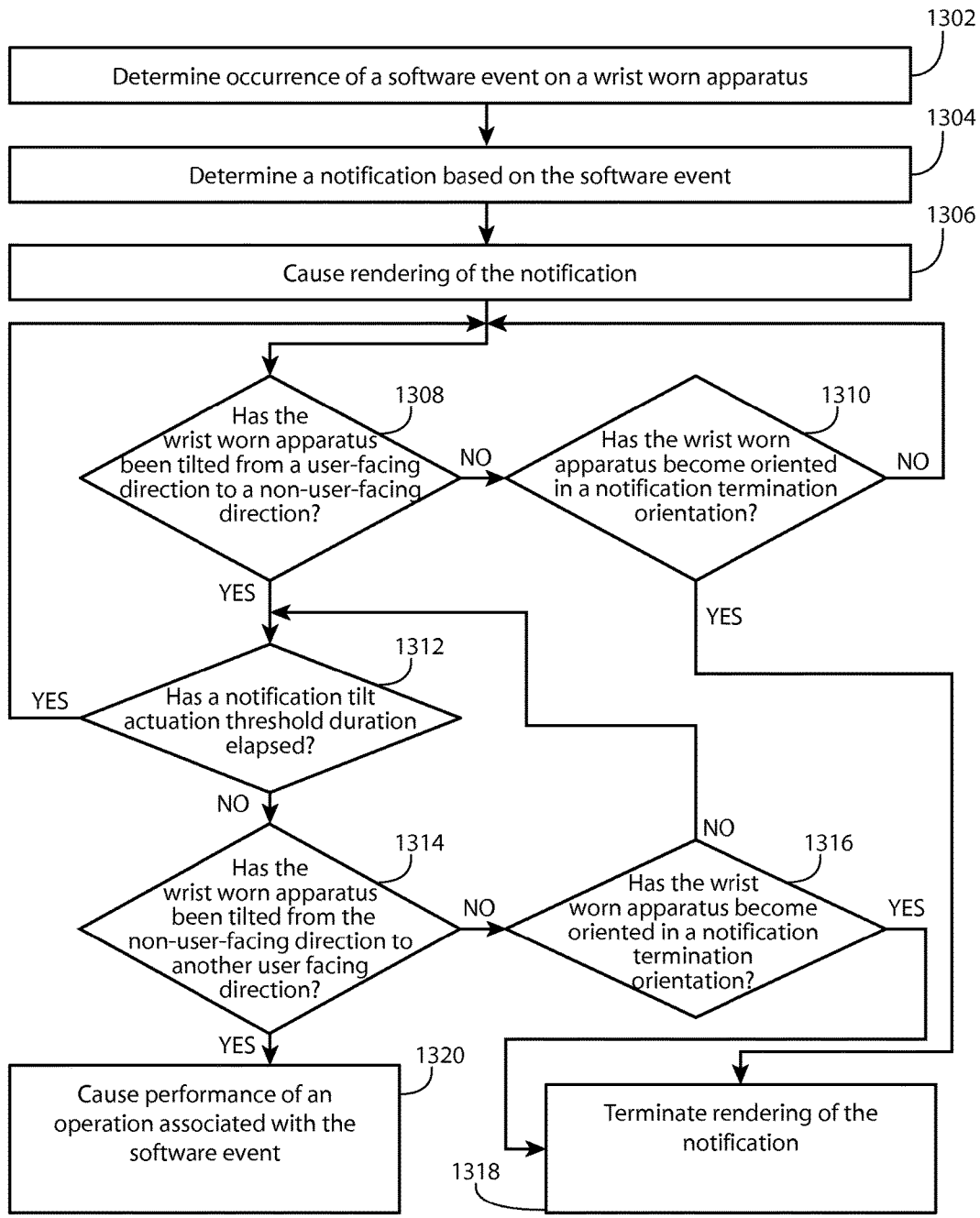
FIG. 13 is a flow diagram illustrating activities associated with performance of an operation based, at least in part, on tilt of a wrist worn apparatus according to at least one example embodiment.

FIG. 13 is a flow diagram illustrating activities associated with performance of an operation based, at least in part, on tilt of a wrist worn apparatus according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

In some circumstances, the user may desire to cause the notification to be terminated. In such circumstances, it may be desirable to allow the user to perform an input that causes the apparatus to terminate rendering of the notification. In at least one example embodiment, the apparatus is configured to cause termination of rendering of the notification based, at least in part, on a determination that the wrist worn apparatus has been reoriented from a user-facing direction to a notification termination orientation. In at least one example embodiment, the notification termination orientation is indicative of a forearm of a wrist upon which the wrist worn apparatus is worn being in an anatomical position. For example, the orientation of the forearm of user 402 of FIG. 4D may correspond with the notification termination orientation. In another example, the notification termination orientation is indicative of gravity being sideward of a notification termination gravity threshold. In such an example, gravity direction 545 of FIG. 5E may correspond with the notification termination orientation. In still another example, the notification termination gravity threshold is a direction that is 45 degrees from a purely sideward direction. In such an example, gravity direction 555 of FIG. 5F may correspond with the notification termination orientation.

In at least one example embodiment, the notification termination orientation is indicative of gravity being sideward of a notification termination gravity threshold. In at least one example embodiment, the notification termination gravity threshold is a direction beyond which the orientation of the apparatus is considered to be in the notification termination orientation. In at least one example embodiment, the notification termination gravity threshold is a direction that is 45 degrees from a purely sideward direction. For example, the notification termination gravity threshold bay correspond with gravity direction 555 of FIG. 5F.

At block 1302, the apparatus determines occurrence of a software event on a wrist worn apparatus, similarly as described regarding block 702 of FIG. 7. At block 1304, the apparatus determines a notification based, at least in part, on the software event such that the notification comprises information that signifies the software event, similarly as described regarding block 704 of FIG. 7. At block 1306, the apparatus causes rendering of the notification, similarly as described regarding block 706 of FIG. 7.

At block 1308, the apparatus determines whether the wrist worn apparatus has been tilted from a user-facing direction to a non-user-facing direction. The determination, the tilt, the user-facing direction, and the non-user-facing direction may be similar as described regarding FIGS. 4A-4D and FIGS. 5A-5F. If the apparatus determines that the wrist worn apparatus has been tilted from a user-facing direction to a non-user-facing direction, flow proceeds to block 1312. If the apparatus determines that the wrist worn apparatus has failed to be tilted from a user-facing direction to a non-user-facing direction, flow proceeds to block 1310.

At block 1310, the apparatus determines whether the wrist worn apparatus has been reoriented from a user-facing direction to a notification termination orientation. If the apparatus determines that the wrist worn apparatus has been reoriented from a user-facing direction to a notification termination orientation, flow proceeds to block 1318. If the apparatus determines that the wrist worn apparatus has failed to be reoriented from a user-facing direction to a notification termination orientation, flow returns to block 1308.

At block 1312, the apparatus determines whether a notification tilt actuation threshold duration has elapsed. The determination and the notification tilt actuation threshold duration may be similar as described regarding FIGS. 6A-6C. If the apparatus determines that the notification tilt actuation threshold duration has failed to elapse, flow proceeds to block 1314. If the apparatus determines that the notification tilt actuation threshold duration has elapsed, flow returns to block 1308.

At block 1314, the apparatus determines whether the wrist worn apparatus has been tilted from the non-user-facing direction to another user-facing direction. The determination, and the other user-facing direction may be similar as described regarding FIGS. 4A-4D, FIGS. 5A-5F, and FIGS. 6A-6C. If the apparatus determines that the wrist worn apparatus has been tilted from the non-user-facing direction to another user-facing direction, flow proceeds to block 1320. If the apparatus determines that the wrist worn apparatus has failed to be tilted from the non-user-facing direction to another user-facing direction, flow proceeds to block 1316.

At block 1316, the apparatus determines whether the wrist worn apparatus has been reoriented from a user-facing direction to a notification termination orientation. If the apparatus determines that the wrist worn apparatus has been reoriented from a user-facing direction to a notification termination orientation, flow proceeds to block 1318. If the apparatus determines that the wrist worn apparatus has failed to be reoriented from a user-facing direction to a notification termination orientation, flow returns to block 1312.

At block 1318, the apparatus terminates rendering of the notification.

At block 1320, the apparatus causes performance of at least one operation associated with the software event, similarly as described regarding block 712 of FIG. 7.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 702 of FIG. 7 may be performed after block 704 of FIG. 7. Furthermore, if desired, one or more of the above-described functions may be optional or may be combined. For example, block 702 of FIG. 7 may be optional and/or combined with block 704 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. A method comprising:
   determining occurrence of a software event on a wrist worn apparatus;
   determining a notification based, at least in part, on the software event such that the notification comprises information that signifies the software event;
   causing rendering of the notification;
   determining that the wrist worn apparatus has been tilted from a user-facing direction to a non-user-facing direction;
   determining that the wrist worn apparatus is progressively tilting from the non-user-facing direction towards another user-facing direction;
   while the wrist worn apparatus is progressively tilting and prior to the wrist worn apparatus becoming oriented in the another user-facing direction, causing display of an animation indicative of a transition from rendering of the notification, wherein the wrist worn apparatus is determined to be oriented in the another user-facing direction based on satisfaction of a directional threshold;
   in an instance in which it is determined that the amount of time from when the wrist worn apparatus has been tilted from the user-facing direction to the non-user-facing direction to a time in which the wrist worn apparatus has been tilted from the non-user-facing direction to the another user-facing direction falls within a notification tilt actuation threshold duration, causing performance of at least one operation associated with the software event based, at least in part, on the determination that the wrist worn apparatus has been tilted from the non-user-facing direction to the another user-facing direction within the notification tilt actuation threshold duration; and
   in an instance in which it is determined that the notification tilt actuation threshold duration has elapsed since the determination that the wrist worn apparatus has been tilted from the user-facing direction to the non-user-facing direction, without the wrist worn apparatus having been tilted from the non-user-facing direction to the another user-facing direction, terminating display of the animation based, at least in part, on the determination that the notification tilt actuation threshold duration has elapsed since determining that the wrist worn apparatus has been tilted from the user-facing direction to the non-user-facing direction.

2. The method of claim 1, wherein the operation associated with the software event comprises:
   determining supplemental information associated with the software event; and
   causing rendering of, at least part of, the supplemental information.

3. The method of claim 2, wherein the notification fails to comprise a part of the supplemental information.

4. The method of claim 2, wherein the notification excludes the supplemental information.

5. The method of claim 2, wherein causing display of the animation comprises causing display of the animation indicative of a transition from display of the notification to display of the supplemental information.

6. The method of claim 1, further comprising:
   determining that the notification tilt actuation threshold duration has elapsed since the determination that the wrist worn apparatus has been tilted from the user-facing direction to the non-user-facing direction; and
   terminating display of the animation based, at least in part, on the determination that the notification tilt actuation threshold duration has elapsed since determining that the wrist worn apparatus has been tilted from the user-facing direction to the non-user-facing direction.

7. The method of claim 1, wherein determining that the wrist worn apparatus has been tilted from the user-facing direction to the non-user-facing direction comprises:
   determining that the wrist worn apparatus is oriented in a user-facing direction; and
   determining that the wrist worn apparatus has become oriented in a direction that is beyond a user-facing directional threshold.

8. The method of claim 7, wherein determining that the wrist worn apparatus has been tilted from the non-user-facing direction to the another user-facing direction comprises determining that the wrist worn apparatus has become oriented in a direction that is within a user-facing directional threshold.

9. The method of claim 7, further comprising:
   determining that the wrist worn apparatus is oriented in another non-user-facing direction: and
   determining that the wrist worn apparatus has become oriented in the user-facing direction, wherein the determination that the wrist worn apparatus has been tilted from the user-facing direction to the non-user-facing direction is predicated by the determination that the wrist worn apparatus is oriented in the other non-user-facing direction.

10. The method of claim 1, further comprising:
    determining another occurrence of the software event on the wrist worn apparatus;
    determining another notification based, at least in part, on the software event such that the notification comprises information that signifies the software event;
    causing rendering of the notification;
    determining that the wrist worn apparatus has been reoriented from a user-facing direction to a notification termination orientation; and
    terminating rendering of the other notification based, at least in part, on the determination that the wrist worn apparatus has been reoriented from the user-facing direction to the notification termination orientation.

11. The method of claim 1 wherein the another user-facing direction is the user-facing direction.

12. The method of claim 1 further comprising determining a tilt progression percentage that represents a tilt direction as a percentage difference between the non-user facing direction and the another user-facing direction, wherein causing display of the animation comprises determining a frame of the animation that corresponds with the tilt progression percentage such that a speed of the animation is controlled by a speed of tilting.

13. The method of claim 1 further comprising:
    determining whether the wrist worn apparatus has been reoriented from the user-facing direction to a notification termination orientation based upon a relationship of gravity acting upon the wrist worn apparatus to a notification termination gravity threshold; and
    in an instance in which the wrist worn apparatus has been reoriented to the notification termination operation, terminating rendering of the notification,
    wherein, in an instance in which the wrist worn apparatus has not been reorientated to the notification termination orientation, the method determines that the wrist worn apparatus has been tilted from the user-facing direction to the non-user-facing direction, determines that the wrist worn apparatus has been tilted from the non-user-facing direction to the another user-facing direction within the notification tilt actuation threshold duration and causes performance of the at least one operation associated with the software event.

14. A wrist worn apparatus comprising
    a display;
    at least one processor; and
    at least one memory including computer program code, the at least one memory and the computer program code configured to, with the at least one processor, cause the apparatus to perform at least the following:
    determining occurrence of a notification;
    causing rendering of the notification, the notification comprises information presented on the display;
    determining that the wrist worn apparatus has been tilted from a user-facing direction to a non-user-facing direction with respect to the display;
    determining that the wrist worn apparatus is progressively tilting from the non-user-facing direction towards another user-facing direction;
    while the wrist worn apparatus is progressively tilting and prior to the wrist worn apparatus becoming oriented in the another user-facing direction, causing display of an animation indicative of a transition from rendering of the notification, wherein the wrist worn apparatus is determined to be oriented in the another user-facing direction based on satisfaction of a directional threshold;
    in an instance in which it is determined that the amount of time from when the wrist worn apparatus has been tilted from the user-facing direction to the non-user-facing direction to a time in which the wrist worn apparatus has been tilted from the non-user-facing direction to the another user-facing direction falls within a notification tilt actuation threshold duration, causing performance of at least one operation associated with the notification based, at least in part, on the determination that the wrist worn apparatus has been tilted from the non-user-facing direction to the another user-facing direction within the notification tilt actuation threshold duration; and
    in an instance in which it is determined that the notification tilt actuation threshold duration has elapsed since the determination that the wrist worn apparatus has been tilted from the user-facing direction to the non-user-facing direction, without the wrist worn apparatus having been tilted from the non-user-facing direction to the another user-facing direction, terminating display of the animation based, at least in part, on the determination that the notification tilt actuation threshold duration has elapsed since determining that the wrist worn apparatus has been tilted from the user-facing direction to the non-user-facing direction.

15. The wrist worn apparatus of claim 14 wherein the operation associated with the notification comprises:
    determining supplemental information associated with the notification; and
    causing rendering at least part of the supplemental information.

16. The wrist worn apparatus of claim 15 wherein causing display of the animation comprises causing display of the animation indicative of a transition from the notification to the supplemental information.

17. The wrist worn apparatus of claim 16 further comprising
    determining that the notification tilt actuation threshold duration has elapsed since the determination that the wrist worn apparatus has been tilted from the user-facing direction to the non-user-facing direction; and
terminating display of the transition based, at least in part, on the determination that the notification tilt actuation threshold duration has elapsed since determining that the wrist worn apparatus has been tilted from the user-facing direction to the non-user-facing direction.

18. The wrist worn apparatus of claim 14 wherein determining that the wrist worn apparatus has been tilted from the user-facing direction to the non-user-facing direction comprises:
determining that the wrist worn apparatus is oriented in a user-facing direction; and
determining that the wrist worn apparatus has become oriented in a direction that is beyond a user-facing directional threshold.

19. The wrist worn apparatus of claim 14 wherein determining that the wrist worn apparatus has been tilted from the non-user-facing direction to the another user-facing direction comprises determining that the wrist worn apparatus has become oriented in a direction that is within a user-facing directional threshold.

20. The wrist worn apparatus of claim 14 wherein the another user-facing direction is the user-facing direction.

21. The wrist-worn apparatus of claim 14 wherein the at least one memory and the computer program code are further configured to, with the at least one processor, cause the apparatus to determine a tilt progression percentage that represents a tilt direction as a percentage difference between the non-user facing direction and the another user-facing direction, wherein causing display of the animation comprises determining a frame of the animation that corresponds with the tilt progression percentage such that a speed of the animation is controlled by a speed of tilting.

22. The wrist-worn apparatus of claim 14 wherein the at least one memory and the computer program code are further configured to, with the at least one processor, cause the apparatus to:
determine whether the wrist worn apparatus has been reoriented from the user-facing direction to a notification termination orientation based upon a relationship of gravity acting upon the wrist worn apparatus to a notification termination gravity threshold; and
in an instance in which the wrist worn apparatus has been reoriented to the notification termination operation, terminate rendering of the notification,
wherein, in an instance in which the wrist worn apparatus has not been reorientated to the notification termination orientation, the apparatus is caused to determine that the wrist worn apparatus has been tilted from the user-facing direction to the non-user-facing direction, determine that the wrist worn apparatus has been tilted from the non-user-facing direction to the another user-facing direction within the notification tilt actuation threshold duration and cause performance of the at least one operation associated with the software event.

23. A non-transitory computer readable medium having executable instructions stored therein that, when executed by at least one processor, cause an apparatus to perform at least the following:
determining occurrence of a notification;
causing rendering of the notification, the notification comprises information presented on a display;
determining that the wrist worn apparatus has been tilted from a user-facing direction to a non-user-facing direction with respect to the display;
determining that the wrist worn apparatus has been tilted from a user-facing direction to a non-user-facing direction;
determining that the wrist worn apparatus is progressively tilting from the non-user-facing direction towards another user-facing direction;
while the wrist worn apparatus is progressively tilting and prior to the wrist worn apparatus becoming oriented in the another user-facing direction, causing display of an animation indicative of a transition from rendering of the notification, wherein the wrist worn apparatus is determined to be oriented in the another user-facing direction based on satisfaction of a directional threshold;
in an instance in which it is determined that the amount of time from when the wrist worn apparatus has been tilted from the user-facing direction to the non-user-facing direction to a time in which the wrist worn apparatus has been tilted from the non-user-facing direction to the another user-facing direction falls within a notification tilt actuation threshold duration, causing performance of at least one operation associated with the notification based, at least in part, on the determination that the wrist worn apparatus has been tilted from the non-user-facing direction to the another user-facing direction within the notification tilt actuation threshold duration; and
in an instance in which it is determined that the notification tilt actuation threshold duration has elapsed since the determination that the wrist worn apparatus has been tilted from the user-facing direction to the non-user-facing direction, without the wrist worn apparatus having been tilted from the non-user-facing direction to the another user-facing direction, terminating display of the animation based, at least in part, on the determination that the notification tilt actuation threshold duration has elapsed since determining that the wrist worn apparatus has been tilted from the user-facing direction to the non-user-facing direction.

* * * * *